US012442429B2

(12) United States Patent
Mathews

(10) Patent No.: US 12,442,429 B2
(45) Date of Patent: Oct. 14, 2025

(54) HIGH DYNAMIC RANGE SUSPENSION APPARATUS WITH SELECTIVE FLUID PRESSURE COMMUNICATION

(71) Applicant: Vorsprung Technologies, Ltd., Whistler (CA)

(72) Inventor: Steven James Mathews, Whistler (CA)

(73) Assignee: Vorsprung Technologies, Ltd., Whistler (CA)

( * ) Notice: Subject to any disclaimer, the term of this patent is extended or adjusted under 35 U.S.C. 154(b) by 453 days.

(21) Appl. No.: 17/318,755

(22) Filed: May 12, 2021

(65) Prior Publication Data

US 2022/0373056 A1 Nov. 24, 2022

(51) Int. Cl.

*F16F 9/02* (2006.01)
*B62K 25/10* (2006.01)
*F16F 9/49* (2006.01)

(52) U.S. Cl.

CPC ............ *F16F 9/0281* (2013.01); *B62K 25/10* (2013.01); *F16F 9/0227* (2013.01); *F16F 9/0236* (2013.01); *F16F 9/49* (2013.01)

(58) Field of Classification Search

CPC ...... F16F 9/0281; F16F 9/0227; F16F 9/0236; F16F 9/49; B62K 25/10

See application file for complete search history.

(56) References Cited

U.S. PATENT DOCUMENTS

| | | | |
|---|---|---|---|
| 4,697,796 A | 10/1987 | Kitamura et al. | |
| 4,852,863 A | 8/1989 | Breitenbacher et al. | |
| 6,042,091 A | 3/2000 | Marzocchi et al. | |
| 6,105,988 A | 8/2000 | Turner et al. | |
| 6,135,434 A | 10/2000 | Marking | |
| 6,311,962 B1 | 11/2001 | Marking | |
| 6,446,771 B1 * | 9/2002 | Sintorn .................. | F16F 9/512 188/319.1 |
| 6,648,310 B2 * | 11/2003 | Rottenberger ............ | F16F 9/18 188/269 |
| 7,195,234 B2 | 3/2007 | Jordan et al. | |
| 7,401,800 B2 | 7/2008 | Jordan | |
| 7,644,943 B2 | 1/2010 | Hayes et al. | |

(Continued)

FOREIGN PATENT DOCUMENTS

| | | |
|---|---|---|
| CN | 107512145 A | 12/2017 |
| EP | 2357098 B1 | 10/2014 |

(Continued)

*Primary Examiner* — Robert A. Siconolfi
*Assistant Examiner* — James K Hsiao

(57) ABSTRACT

A suspension apparatus includes a spring piston and a spring tube body. The spring piston is slidably disposed within the spring tube body to move within the spring tube body over a travel along an axis of reciprocation. The spring piston bounds a primary positive gas spring chamber at least a first portion of a primary negative gas spring chamber. The suspension apparatus also includes a secondary negative gas spring chamber and a separator. The separator permits fluid pressure communication between the primary negative gas spring chamber and the secondary negative gas spring chamber over a first portion of the travel of the spring piston, and the separator prevents fluid pressure communication between the primary negative gas spring chamber and the secondary negative gas spring chamber over a second portion of the travel of the spring piston.

9 Claims, 14 Drawing Sheets

209 211 207A 205 235 241 237 291 247 293 203A 213 245 201 231 243 203B 239 227B 207B 217 225 227A 233 215 229 221 223 219 200

(56) References Cited

U.S. PATENT DOCUMENTS

| | | | |
|---|---|---|---|
| 7,703,585 B2 | 4/2010 | Fox | |
| 7,837,180 B2 | 11/2010 | Jordan | |
| 7,870,936 B2 | 1/2011 | Shipman | |
| 7,963,509 B2 | 6/2011 | Fox | |
| 8,162,343 B2 | 4/2012 | Weiss et al. | |
| 8,167,328 B2 | 5/2012 | Powell et al. | |
| 8,191,903 B2 | 6/2012 | Beuermann et al. | |
| 8,448,761 B2 | 5/2013 | Shipman et al. | |
| 8,464,850 B2 | 6/2013 | Fox | |
| 8,465,025 B2 | 6/2013 | Venton-Walters et al. | |
| 8,585,025 B2 | 11/2013 | Lee | |
| 8,585,062 B2 | 11/2013 | Hunter | |
| 8,764,029 B2 | 7/2014 | Venton-Walters et al. | |
| 8,800,973 B2 | 8/2014 | Pelot | |
| 8,807,300 B2 | 8/2014 | Marking | |
| 8,843,273 B2 | 9/2014 | Wesling et al. | |
| 8,894,050 B2 | 11/2014 | Wootten et al. | |
| 8,936,139 B2 | 1/2015 | Galasso et al. | |
| 8,991,834 B2 | 3/2015 | Venton-Walters et al. | |
| 9,139,061 B2 | 9/2015 | Delorenzis | |
| 9,150,075 B2 | 10/2015 | Laird et al. | |
| 9,156,325 B2 | 10/2015 | Galasso et al. | |
| 9,156,519 B2 * | 10/2015 | Ripa | B62K 25/04 |
| 9,239,090 B2 | 1/2016 | Marking | |
| 9,656,531 B2 | 5/2017 | Laird et al. | |
| 9,657,803 B2 * | 5/2017 | Slusarczyk | B21D 22/20 |
| 9,688,112 B2 | 6/2017 | Venton-Walters et al. | |
| 9,688,347 B2 | 6/2017 | Yablon et al. | |
| 9,855,812 B2 | 1/2018 | Galasso et al. | |
| 9,988,124 B2 | 6/2018 | Kwaterski | |
| 10,156,279 B2 * | 12/2018 | Barefoot | B62K 25/04 |
| 10,525,785 B2 | 1/2020 | Rose et al. | |
| 2002/0175035 A1 * | 11/2002 | Achenbach | F16F 9/084 188/315 |
| 2007/0200311 A1 | 8/2007 | Beck | |
| 2008/0296814 A1 | 12/2008 | Franklin et al. | |
| 2010/0244340 A1 | 9/2010 | Wootten et al. | |
| 2010/0276906 A1 | 11/2010 | Galasso et al. | |
| 2011/0202236 A1 | 8/2011 | Galasso et al. | |
| 2013/0234377 A1 | 9/2013 | Leonard | |
| 2016/0001847 A1 | 1/2016 | Diaz | |
| 2016/0272029 A1 | 9/2016 | Anderson et al. | |
| 2016/0311498 A1 | 10/2016 | Bossard | |
| 2016/0348747 A1 | 12/2016 | Franklin et al. | |
| 2017/0356518 A1 | 12/2017 | Gustafsson Vallander et al. | |
| 2018/0057100 A1 | 3/2018 | Fox | |
| 2019/0381848 A1 * | 12/2019 | Barefoot | F16F 9/062 |

FOREIGN PATENT DOCUMENTS

| | | |
|---|---|---|
| EP | 3098474 A1 | 11/2016 |
| WO | 02079021 A2 | 10/2002 |

* cited by examiner 190
191
192
194
195
196
197
SPRING FORCE
0%
100%
DISPLACEMENT (CURRENT COMPRESSION AS PERCENTAGE OF AVAILABLE TRAVEL)

SPRING FORCE
DISPLACEMENT (CURRENT COMPRESSION AS PERCENTAGE OF AVAILABLE TRAVEL)
0%
100%
501
551
553
503
505
507

800
831
829
833
803
801
809
825
827
811
805
823
821
807
815
813
837
839
841
835
817
819

HIGH DYNAMIC RANGE SUSPENSION APPARATUS WITH SELECTIVE FLUID PRESSURE COMMUNICATION

TECHNICAL FIELD

This disclosure relates generally to vehicle suspension, including, without limitation, suspension for mountain bicycles, supermoto class motorcycles, motocross motorcycles, rally cars, and other vehicles whose operating parameters call for tunable suspension whose spring curve is substantially linear over a portion, typically the initial to middle portion of the suspension's travel, and which progressively ramps up in another portion, typically a latter portion, of the suspension's travel to provide mid-stroke support and resistance to bottoming out. More specifically, this disclosure relates to a high dynamic range suspension apparatus with selective fluid pressure communication.

BACKGROUND

Advances in related fields, such as tire design and materials science have significantly expanded the potential of certain suspended vehicles to perform at a high level across a wide range of operating conditions. If provided with suspension that is both responsive and able to provide appropriate spring force, certain performance vehicles can corner harder than before and, at the same time, absorb significant vertical deceleration (i.e., landing jumps and drops) in a controlled manner.

However, vehicles are highly interconnected systems, and translating the improvements in tire compounds and manufacturing composite components into performance gains is, in large part, dependent on the suspension's responsiveness and ability to consistently provide an appropriate suspension force between the vehicle and the ground. For example, improvements in the stickiness of a tire compound are meaningless if the suspension is not sufficiently responsive to maintain contact between the tire and ground or does not adequately support the sprung mass of the vehicle. Similarly, the strength gains in components such as rims and frames provided by increasing mastery of molding carbon fiber are likewise meaningless if the strengthened wheels and frames are coupled to suspension components which cannot provide a sufficient spring force to absorb the compressive forces arising from larger jumps and drops.

The spring force for such performance vehicles' suspension has typically been provided by either gas springs or coil springs. Historically, both coil and gas springs have been limited with respect to the dynamic range over which they perform best. In choosing between coil or gas springs, users have been historically forced to compromise on the spring's performance over at least one portion of the spring's travel.

Coil springs typically provide a linear spring curve over the initial and middle portions of the spring's travel. As used in this disclosure, the expression "linear spring curve" encompasses a portion of a spring curve with a constant spring rate (i.e., the relationship between force applied to the spring and compression of the spring). The constancy of the spring rate of certain coil springs over the initial to middle portions of their travel is generally and favorably associated with minimal levels of early stroke resistance and high levels of responsiveness in the early to middle portions of the spring's travel. From a performance standpoint, coil springs can maintain a consistent contact patch between the tire and the ground over uneven surfaces, which enhances cornering and climbing traction. However, while the linear spring curve of a coil spring provides good performance over the early to middle portion of a suspension's travel, the coil spring's performance degrades as the suspension is compressed further, as coil springs are prone to failing to adequately support the sprung mass of the vehicle, or abruptly hitting the end of their travel (also known as "bottoming out") or exhibiting harsh, discontinuous increases in spring rate during maneuvers creating heavy compressive loads on the spring. Thus, coil springs exhibit a limited dynamic range, and their use generally entails giving up late-stroke support in favor of early-stroke responsiveness.

Historically, gas springs also exhibit a limited dynamic range, and demand a tradeoff in performance between different portions of the spring's travel, wherein the "sweet spot" of a gas spring's performance occurs in the middle to latter portions of the suspension's travel, and the off-peak performance appears in the earlier portions of the spring's travel. In contrast to a coil spring, where the spring rate is generally constant and the spring force is generally proportional to a spring constant multiplied by the displacement of the spring, the spring rate of certain gas springs varies significantly across the travel. This is because the spring force provided by a gas spring is the sum of the ratios between the initial to present volumes of the one or more gas spring chambers of the gas spring. In a gas spring comprising a piston disposed between and acted upon by a single negative gas spring chamber and a single positive gas spring chamber, the spring curve will be significantly non-linear (i.e., the spring rate varies significantly with displacement) in the earliest portions of the suspension's travel, as well as in the later portions of the suspension's travel. From a performance standpoint, these regions of non-linearity are a mixed blessing. On the one hand, the non-linear increase in spring rate in the latter portions of the suspension's travel (sometimes referred to as "ramp up") is desirable in that the spring force rises rapidly with displacement at the end of the stroke, providing support to resist large compressive forces, thereby avoiding the harsh "bottoming out" effects and discontinuities in the spring force exhibited by coil springs under heavy compression. On the other hand, the non-linearity in spring rate in the initial stages of certain gas springs' travel is generally undesirable in that, compared to a coil spring, disproportionately larger forces are required to initially compress a gas spring. From a performance standpoint, this initial non-linearity in the spring curve appears as a lack of early-stroke responsiveness, and reduced bump compliance, which can decrease the suspension's ability to maintain a contact patch over uneven terrain, thereby diminishing cornering and climbing capacity.

Beyond the above-described tradeoffs in terms of the springs' dynamic ranges, the choice between coil springs and gas springs requires users to make further compromises on other aspects of suspension performance. For example, gas springs are typically significantly lighter and offer greater range for tuning than coil springs.

Thus, expanding the dynamic range of vehicle suspension springs, and in particular, developing springs which provide the linear spring curve of a coil spring over an initial range of travel, while providing the desirable non-linear ramp-up of a gas spring over a latter range of travel remains a source of technical challenges and opportunities for improvement in the art.

SUMMARY

This disclosure provides a high dynamic range suspension apparatus with selective fluid pressure communication.

In a first embodiment, a suspension apparatus includes a spring piston having a first side and a second side, and a spring tube body having a first end and a second end, wherein the spring piston is slidably disposed within the spring tube body to move within the spring tube body over a travel along an axis of reciprocation. The spring piston bounds a primary positive gas spring chamber disposed between the first side of the spring piston and the first end of the spring tube body and the spring piston bounds at least a first portion of a primary negative gas spring chamber disposed between the second side of the spring piston and the second end of the spring tube body. The suspension apparatus also includes a secondary negative gas spring chamber and a separator disposed between the secondary negative gas spring chamber and the primary negative gas spring chamber. The separator permits fluid pressure communication between the primary negative gas spring chamber and the secondary negative gas spring chamber over a first portion of the travel of the spring piston, and the separator prevents fluid pressure communication between the primary negative gas spring chamber and the secondary negative gas spring chamber over a second portion of the travel of the spring piston.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1A through 8, discussed below, and the various embodiments used to describe the principles of this disclosure in this patent document are by way of illustration only and should not be construed in any way to limit the scope of the disclosure.

Certain embodiments according to the present disclosure provide, without limitation, the technical benefits of expanding the dynamic range of a gas spring for use in a suspension system by providing selective fluid communication between two or more chambers of the spring. In this way, suspension apparatus according to certain embodiments as disclosed herein provide a spring curve that, like a coil spring, is substantially linear (i.e., exhibits a constant spring rate) over the initial to middle portions of the spring's travel, and at the same time, provides the progressive increase in spring force of a gas spring (i.e., has a spring rate which increases with travel) towards the end of the spring's travel. Further, certain gas springs according to this disclosure retain the ancillary advantages of gas springs over coil springs, including, without limitation, weight savings, and high levels of tunability, such as by changing spring pressures or volumetric adjustments (i.e., volume spacers or tokens, and ramp control devices).

As background, and to clarify the technical problems addressed by certain embodiments according to this disclosure, FIGS. 1A-1G provide an overview of the operation of coil and gas springs used in vehicle suspension apparatus and both types of springs' limited dynamic range. For consistency and convenience of cross-reference, elements which are common to more than one of FIGS. 1A-1G are numbered similarly.

Figures 1A, 1B, 1C:
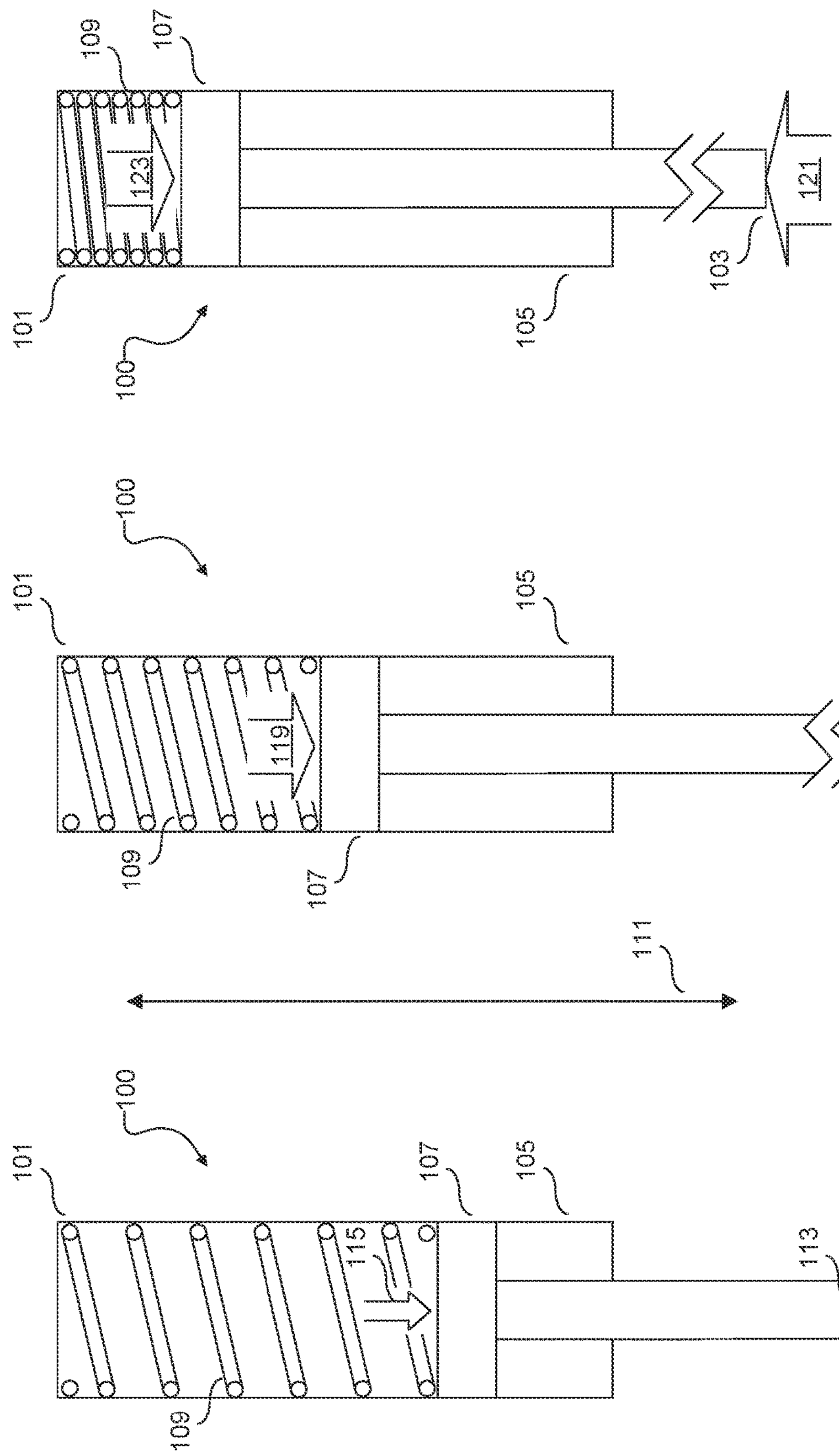
FIGS. 1A-1G provide an overview of the operation and limitations of certain coil and gas springs.

Referring to the example of FIG. 1A, a coil spring unit 100 is shown in the figure. Coil spring unit 100 may be disposed at least partially within one leg of the fork, while a damper unit is disposed in the other leg of the fork. In certain cases, coil spring unit 100 is part of an open bath spring/damper assembly. In some cases, coil spring unit 100 is part of a shock assembly (for example, the rear shock of a motorcycle or mountain bike). As shown in FIG. 1A, coil spring unit 100 includes a first end 101 and a second end 103.

Coil spring unit 100 suspends a portion of a vehicle and its operator's mass, meaning that in some cases, first end 101 is connected to the portion of the vehicle containing the operator (for example, the body of a car, the frame of a motorcycle, or the crown of a suspension fork) and second end 103 is connected to an axle upon which one or more wheels of the vehicle rotate. In some embodiments, such as with inverted suspension forks, first end 101 is connected to the axle and second end 103 is connected to the frame or other point of connection to the bulk of the suspended vehicle's mass.

As shown in the example of FIG. 1A, coil spring unit 100 further comprises a spring tube body 105, a spring piston 107 and a coil spring 109. In some cases, spring tube body 105 is a standalone component (for example, part of a spring cartridge). In some cases, spring tube body 105 is part of another suspension component (for example, a stanchion of a suspension fork). Spring piston 107 is slidably disposed within spring tube body 105 and can slide within spring tube body along a travel 111. Coil spring unit 100 operates such that, forces applied at second end 103 compress coil spring 109 between the top of spring piston 107 and first end 101, in response to which, coil spring 109 is compressed to the point of providing an equal and opposite force to the force applied at second end 103. For at least the initial to middle portions of travel 111, the force exerted by coil spring 109 scales linearly with the displacement of spring piston 107 along travel 111. In other words, over some portion of travel 111, coil spring 109 generally obeys Hooke's law, such that if, for example, a force of 50 pounds required to compress coil spring 109 half an inch, a force of 100 pounds is required to compress coil spring 109 an inch.

Referring to the illustrative example of FIG. 1A, coil spring unit 100 is shown in a position where spring piston 107 is at or near the beginning of its travel 111. In some embodiments, the position of spring piston 107 within spring tube body 105 corresponds to a sagged state, wherein coil spring 109 is compressed only by a static, baseline load (for example, a portion of the weight of a bicycle and its rider, when the bicycle is not moving). As shown in FIG. 1A, a first normal force 113 supporting a portion of the bicycle and its rider's weight displaces spring piston 107 up and into spring tube body 105 until coil spring 109 is sufficiently compressed to generate a first spring force 115. In the illustrative example of FIG. 1A, spring piston 107 is in an initial portion of travel 111. Assuming that friction within coil spring unit 100 is low, the magnitude of first spring force 115 is linearly proportional to the displacement of spring piston 107. In other words, coil spring 109 exhibits a constant spring rate during this portion of travel 111. From a performance standpoint, the linear relationship between the displacement of spring piston 107 and first spring force 115 generated by coil spring 109 translates into small-bump responsiveness and consistent contact between at least one wheel of the vehicle and the ground.

FIG. 1B illustrates a second view of coil spring unit 100 in which spring piston 107 is in a middle portion of travel 111. According to some embodiments, FIG. 1B corresponds to a dynamic, or transient state of coil spring unit 100, wherein spring piston 107 is further pushed upwards into spring tube body 105, by a second normal force 117, which is larger than first normal force 113 in FIG. 1A. Second normal force 117 may be caused by, without limitation, a wheel striking an obstacle (for example, a rock or curb), hard cornering, or forward acceleration or deceleration. As shown in FIG. 1B, second normal force 117 compresses coil spring 109 to the point where coil spring 109 exerts a second spring force 119, which is of equal magnitude to second normal force 117. In the example of FIG. 1B, coil spring 109 is in an operating range where it still generally obeys Hooke's law, with second spring force 119 being linearly proportional to the displacement of spring piston 107. Again, the spring rate of coil spring 109 remains constant in this middle portion of travel 111.

FIG. 1C illustrates a third view of coil spring unit 100, where, in response to third normal force 121 (for example, a force generated as a result of a jumping maneuver or riding over a large rock), spring piston 107 is pushed to a point along travel 111, where the linear relationship between the spring force provided by coil spring 109 and displacement of spring piston 107 breaks down, with third spring force 123 being of a magnitude which is discontinuous with the linear spring force provided in earlier portions of travel 111. In other words, the spring rate of coil spring unit 100 can vary discontinuously in this latter portion of travel 111. Depending on the design of coil spring unit 100, the discontinuity in the spring rate may be produced by a bumper system or other apparatus engaging and rapidly increasing the spring rate of the system. In many cases, the condition shown with reference to FIG. 1C occurs in the final portion of travel 111 and is sometimes referred to as "bottoming out." From a performance standpoint, the condition shown in FIG. 1C can often be undesirable, in that the sprung mass of the vehicle is insufficiently supported, a condition often associated with an abrupt transfer of loads previously supported by coil spring unit 100 to other parts of the vehicular system (for example, a rider's knees), and can result in unwanted weight shifts and loss of traction. Historically, this unpredictable variation in spring rate and breakdown in the linear relationship between spring force and displacement in the latter portions of travel 111 has been regarded as part of a necessary tradeoff for the high responsiveness and predictable behavior coil springs provide in the initial to middle portions of travel 111.

Figure 1F:
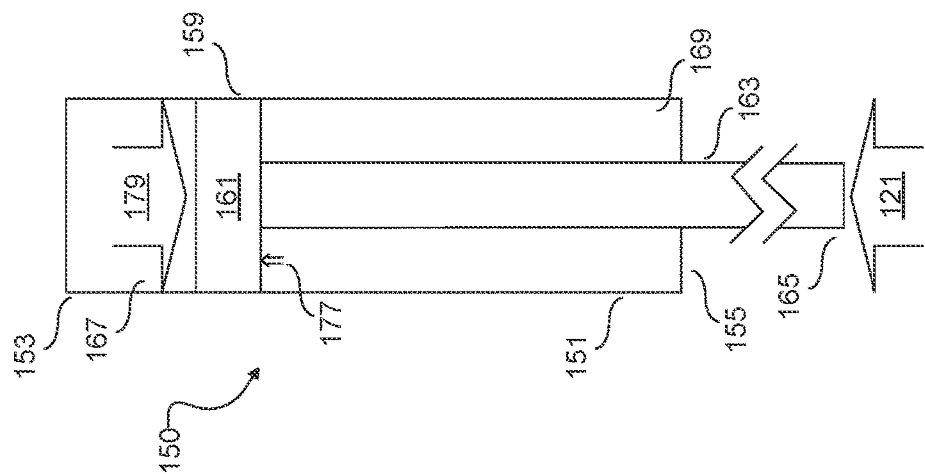
Figure 1E:
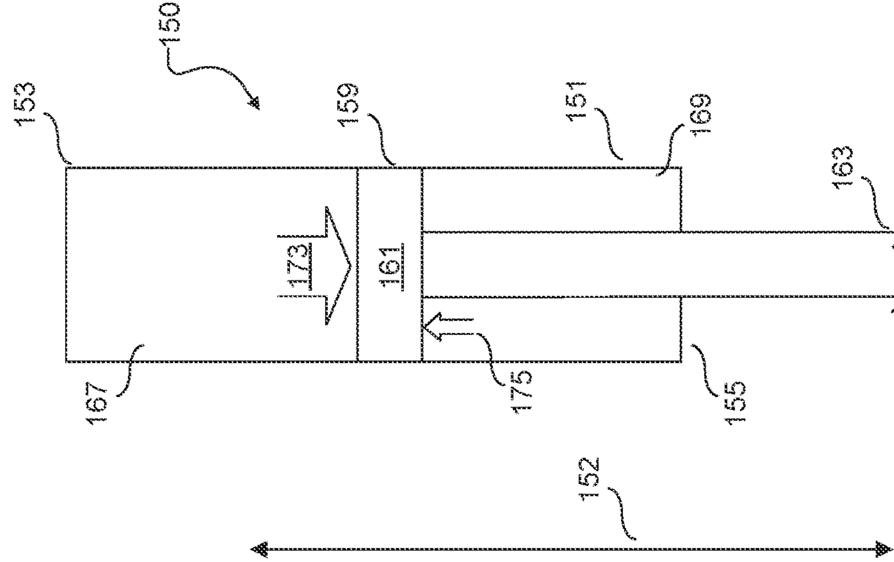
Figure 1D:
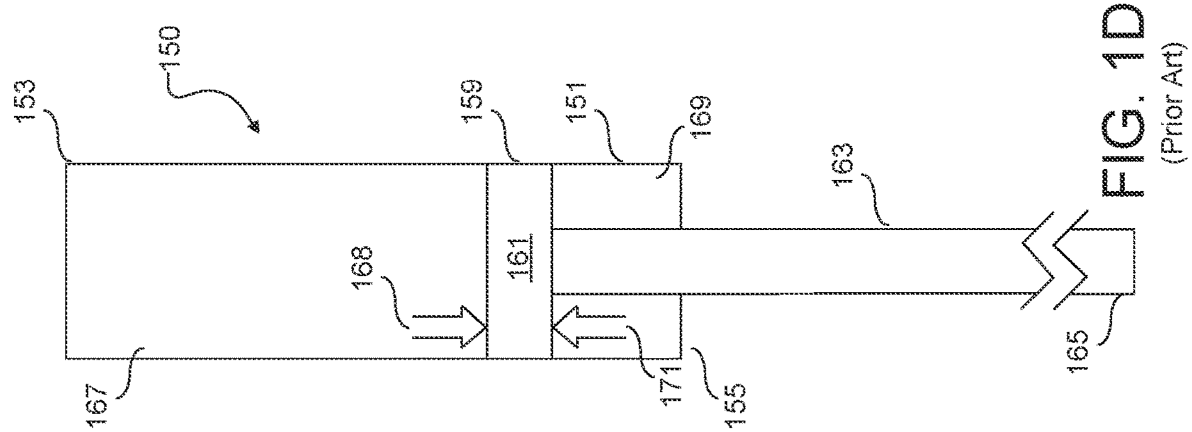

FIGS. 1D through 1F illustrate aspects of the operation of a basic single negative chamber/single positive chamber gas spring unit 150, and the tradeoffs in dynamic range and suspension performance such springs present. For convenience and ease of cross-reference, elements common to more than one figure are numbered similarly.

Referring to the explanatory example of FIG. 1D, gas spring unit 150 comprises a gas spring tube body 151 having a first end 153 and a second end 155. Gas spring unit 150 further comprises a gas spring piston 161 which is slidably movable and sealingly engaged (i.e., with a seal, gasket, O-ring or other structure which prevents the passage of pressurized gas along the interface 159 between gas spring piston 161 and gas spring tube body 151). Gas spring piston 161 further comprises a piston shaft 163 which is slidably and sealingly connected to second end 155 of gas spring tube body 151, such that gas spring piston 161 can reciprocate within gas spring tube body 151 along a travel 152.

As shown in FIG. 1D, gas spring piston 161 bounds part of a positive gas spring chamber 167, comprising a first volume of gas under pressure and exerting a first force 168 in a first direction upon gas spring piston 161. Further, gas spring piston 161 also bounds part of a negative gas spring chamber 169, comprising a second volume of gas exerting a second force 171 upon gas spring piston 161 in a direction opposite to first force 168.

In the example of FIG. 1D, there is no fluid communication (i.e., movement of gas) between positive gas spring chamber 167 and negative gas spring chamber 169. Further, in this example, gas spring unit 150 is shown in an initial equilibrium state between the positive and negative gas spring chambers at the beginning of travel 152. In this initial equilibrium state, the downward force exerted upon gas spring piston 161 by the gas in positive gas spring chamber

167 equals the upward force exerted upon gas spring piston 161 by the gas in negative gas spring chamber 169. Further, for steady state conditions, such as shown in FIG. 1D, the pressures and volumes of gas in positive gas spring chamber 167 and negative gas spring chamber 169 can be generally approximated by Boyle's law, wherein the pressure within the gas spring chamber is given by Equation 1, below:

$$P = P_{init}\left(\frac{V_{init}}{V}\right) \quad (1)$$

Where P is the current pressure within the gas spring chamber, $P_{init}$ is an initial pressure within the gas spring chamber, Vinit is an initial volume of the gas spring chamber, and V is the current volume of the gas spring chamber. Thus, as gas spring piston 161 moves up within gas spring tube body 151, positive gas spring chamber 167 decreases in volume, and the gas within the chamber increases in pressure according to Equation (1). Similarly, as gas spring piston 161 moves up within gas spring tube body 151, negative gas spring chamber 169 decreases in volume, and the gas within the chamber decreases in pressure according to Equation (1). Thus, the magnitude of the spring force exerted by gas spring unit 150 is the magnitude of first force 168 minus second force 171. Further, depending on the bias between the compression ratio of the positive gas spring chamber and the expansion ratio of the negative gas spring chamber, the spring rate (i.e., the gradient of the force/displacement curve) of gas spring unit 150 increases and decreases across travel 111.

Recognizing that, during use, the temperature of the gas in a gas spring can vary in response to expansion and compression, as well as the passage of heat into and out of the system, the dynamic relationship between pressure, volume and temperature in a gas spring chamber can be described by the combined gas law, shown below as Equation (2):

$$\frac{PV}{T} = k \quad (2)$$

Where, for a given body of gas, the product of pressure and volume, divided by temperature is a constant.

As discussed in greater detail with reference to FIG. 1G, historically, in single negative chamber/single positive chamber gas springs, the gas spring is configured such that the expansion ratio of the negative gas spring chamber is significantly greater than the compression ratio of the positive gas spring chamber. That is, to balance form factor (i.e., without extending the stack height of a fork or requiring an additional fork crown), weight and performance requirements, suspension apparatus are configured with a bias towards a larger expansion ratio of the negative gas spring chamber relative to the compression ratio of the positive gas spring chamber.

As used in this disclosure, the expression "expansion ratio of a negative gas spring chamber" encompasses the ratio of the volume of the negative gas spring chamber at full expansion relative to its initial volume. In other words, the expansion ratio of a negative gas spring chamber may be given as: (final negative volume)/(initial negative volume). Similarly, as used in this disclosure the expression "compression ratio of a positive gas spring chamber" encompasses the ratio of the initial volume of a positive gas spring chamber relative to the volume of the final, or fully compressed volume of the positive gas spring chamber. In other words, the compression ratio of a positive gas spring chamber may be given as: (initial positive volume)/(final positive volume). Typical compression ratios for suspension forks are around 2.8:1, while expansion ratios vary significantly, but can be as high as 100:1. The bias towards greater expansion ratios relative to compression ratios means that, the upward force exerted by the gas in the negative gas spring chamber drops off comparatively rapidly in the initial part of travel 152, resulting in a high initial spring rate (i.e., a steeper initial spring curve) By implication, the net spring force of gas spring unit 150 is disproportionately higher and less linear than that of an equivalent coil spring in the initial part of travel 152. From a performance perspective, the relatively higher, less linear spring curve of gas spring unit 150 at the start of travel 152 translates to an initial lack of responsiveness and small bump compliance relative to coil springs.

FIG. 1E illustrates a view of gas spring unit 150 in mid-stroke, where a second normal force 117 is applied (for example, by an axle, swingarm, or other suspension component) to first end 165 through a piston shaft 163, which sealingly and slidingly interfaces (for example, through a bushing/O-ring pair in a lower bulkhead disposed at second end 155), with gas spring tube body 151, driving gas spring piston 161 upwards within gas spring tube body 151, compressing the gas within positive gas spring chamber 167 and expanding the gas within negative gas spring chamber 169, such that the sum of downward force 173 and upward force 175 upon gas spring piston 161 is equal and opposite to second normal force 117. As discussed further with reference to FIG. 1G, in mid-stroke, negative gas spring chamber 169 exerts a non-trivial counteracting force against to the downward force exerted by positive gas spring chamber 167 that, while by no means linear, the spring curve of gas spring unit 150 more closely tracks that of coil spring unit 100. However, as shown in FIG. 1G, while the mid-stroke behavior of gas spring unit 150 is an improvement upon the relatively large spring rate observed in the initial stroke, gas spring unit 150 still displays a significantly non-linear spring response, forcing users to compromise between supportiveness (e.g., greater spring force) and responsiveness.

FIG. 1F illustrates gas spring unit 150 near the end of travel 152, where third normal force 121 pushes gas spring piston 161 further up into gas spring tube body 151. As discussed with reference to FIG. 1C, this is where the useful dynamic range of coil spring unit 100 ends, and the linear relationship between displacement and spring force provided by coil spring 109 breaks down, resulting in abrupt discontinuities in the suspension force provided by coil spring unit 100, which are propagated to other components of the vehicular system. It is in these latter portions of travel 152 where gas spring unit 150 begins to clearly outperform coil spring unit 100. Referring to the example of FIG. 1F, third normal force 121 displaces gas spring piston 161 to the point where negative gas spring chamber 171 has been so expanded from its initial volume such that negative gas spring chamber 169 is significantly expanded from its initial volume and exerts an increasingly negligible upward force 177 on gas spring piston 161, and the net spring force becomes almost entirely a function of the downward force 179 generated in positive gas spring chamber 167. In performance terms, this progressive increase in spring rate translates to avoiding the discontinuities in spring rate which coil springs can display near the end of their travel. In other words, instead of bottoming out, gas spring unit 150 provides continuous support for the sprung mass of the vehicle, even under heavy compression.

Figure 1G:
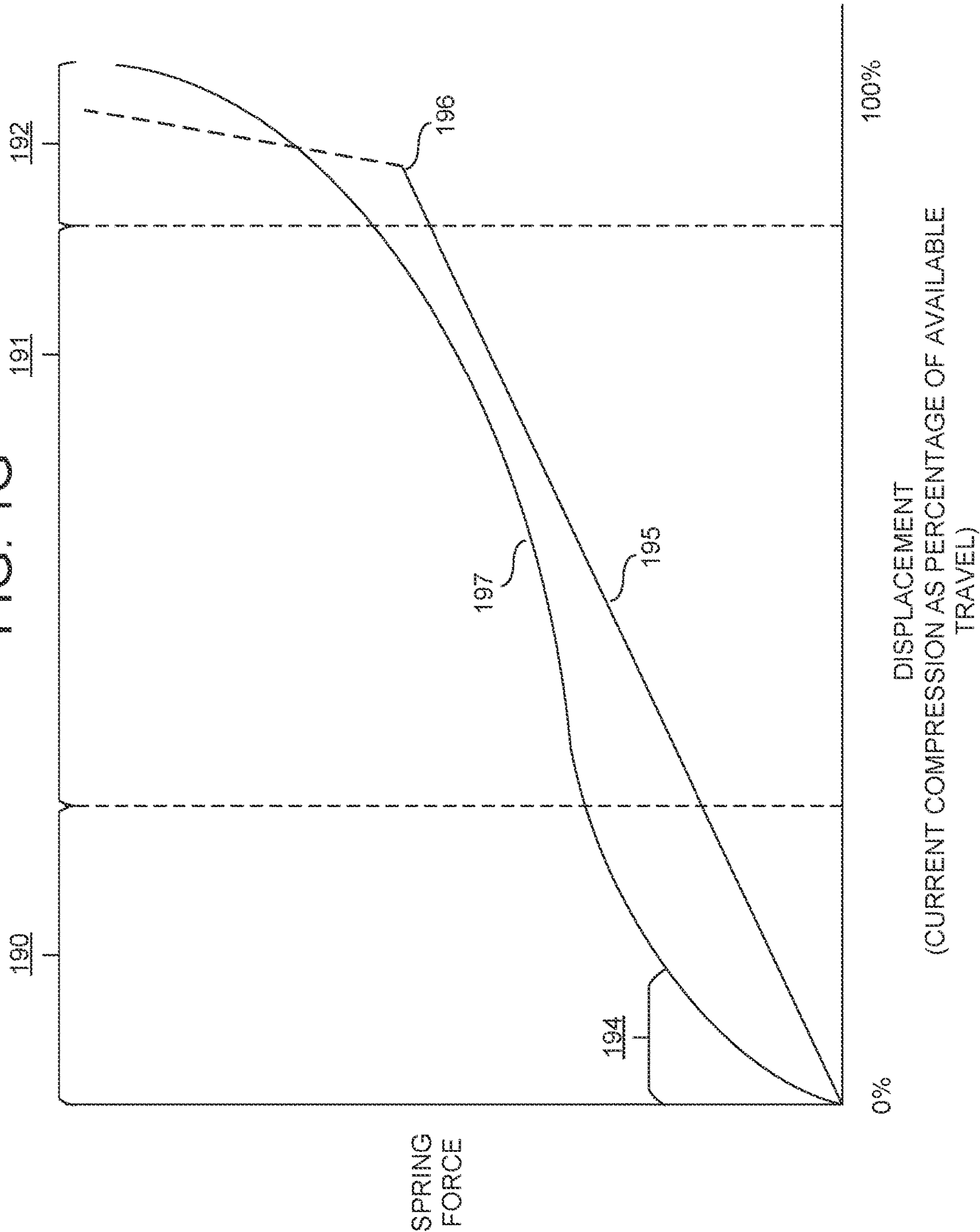

FIG. 1G provides a comparative example of the spring curves (e.g., the relationships between displacement and spring force) between a coil spring unit (for example, coil spring unit 100 in FIGS. 1A-1C) relative to that of a gas spring unit (gas spring unit 150 in FIGS. 1D-1F).

Referring to the explanatory example of FIG. 1G, the travel of a suspension spring can be characterized as having three portions, an initial stroke 190, a mid-stroke 191, and an end stroke 192. In this example, a first spring curve 195 of a coil spring unit and a second spring curve 197 for a gas spring unit are shown in the figure.

As shown in FIG. 1G, first spring curve 195 is linear in both the initial stroke (as shown, for example, in FIG. 1A) and mid-stroke (as shown, for example, in FIG. 1B) portions of the spring's travel. In other words, the spring rate of the coil spring remains constant through initial stroke 190 and mid-stroke 191, but, as shown by the dotted lines beginning at point 196, this linearity breaks down, and the coil spring unit reaches the upper limits of its useful dynamic range.

By contrast, second spring curve 197 is S-shaped, with a period 194 in which the spring rate is high (i.e., a steep spring curve) and variable in the early portions of initial stroke 190, resulting in a disproportionately high, non-linear spring force. As discussed herein, due to the size and non-linearity of the spring rate in this portion of the travel, period 194 is, in effect, outside the gas spring's useful dynamic range, wherein the suspension does not meaningfully compress in response to changes in applied force below a threshold magnitude. Rather, the gas spring unit's useful dynamic range begins as it approaches mid-stroke 191, and excels towards end stroke 192, where it provides a progressive increase in spring force at points in the stroke where the performance of certain coil springs (for example, coil spring unit 100 in FIG. 1) is diminished. Thus, from a performance perspective, developing suspension springs which combine the early stroke responsiveness and mid stroke linearity of a coil spring with the tunability and progressive end-stroke ramp up of a gas spring remains an unsolved problem and an opportunity for improvements in the art.

Figure 2:
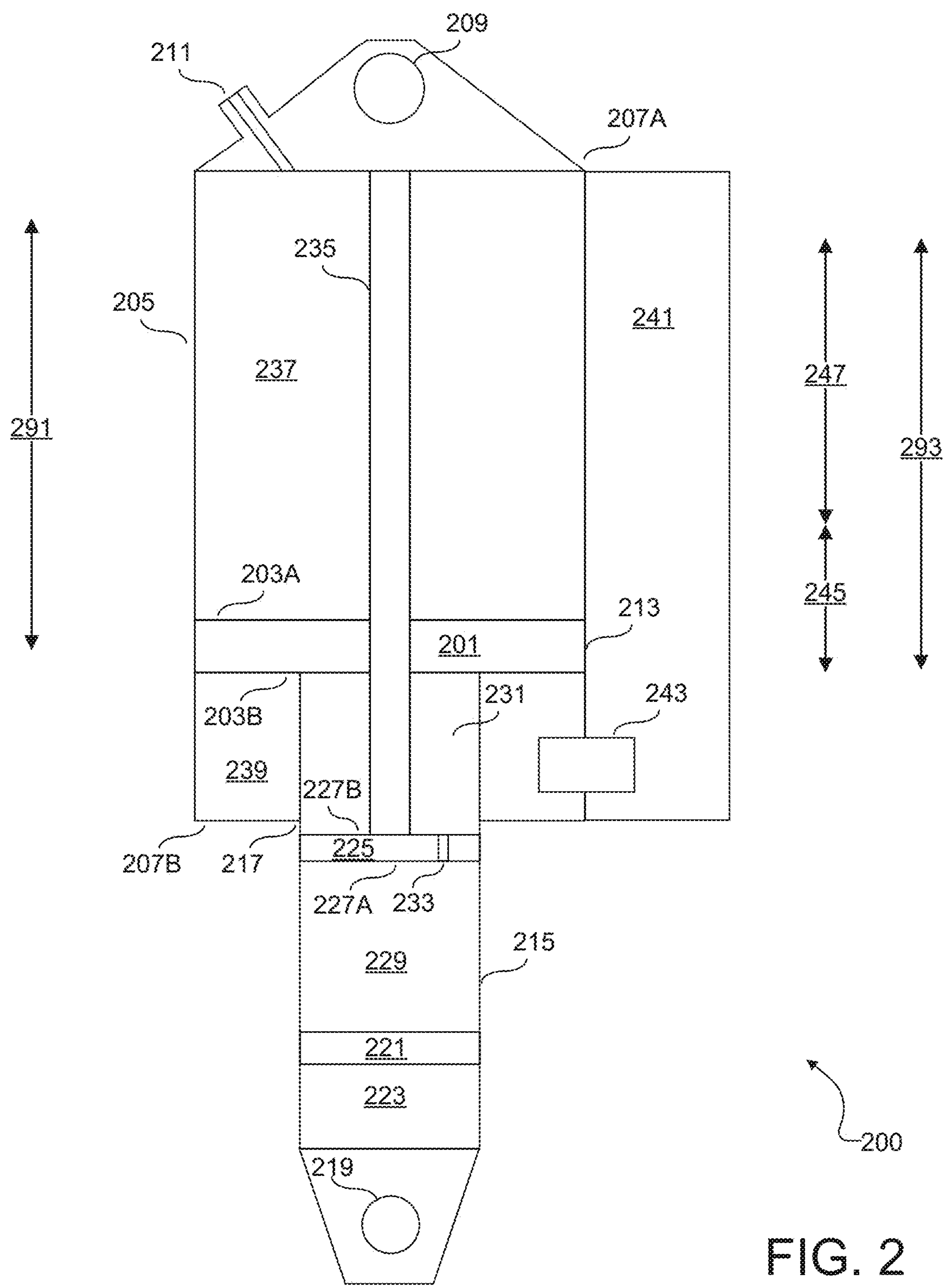
FIG. 2 illustrates, in cutaway view, an example of a suspension apparatus according to various embodiments of this disclosure.

FIG. 2 illustrates, in cross-section view, an example of a suspension apparatus 200 according to various embodiments of this disclosure.

Referring to the non-limiting example of FIG. 2, suspension apparatus 200 is a gas sprung shock absorber, providing both a suspension force and suspension damping. According to certain embodiments, suspension apparatus 200 comprises a spring tube body 205, comprising a first end 207*a* and a second end 207*b*. In some embodiments, spring tube body 205 comprises a single piece of pressure resistant material (for example, a machined aluminum, magnesium, or steel casting) with a smooth internal bore. In some embodiments, spring tube body 205 may comprise a plurality of components, such as a main tube and threaded top and bottom caps at first end 207*a* and second end 207*b* respectively. According to certain embodiments, the exterior of first end 207*a* comprises an eyelet or trunnion 209 by which suspension apparatus 200 can be pivotably anchored to one of the suspended mass of a vehicle (for example, to the front triangle of a dual suspension bicycle, or the body of a car) or to a connection mechanism (for example, a swingarm) to one or more wheels of the vehicle. Spring tube body 205 may further comprise one or more valves 211 through which gas can be added or removed from inside spring tube body 205.

Suspension apparatus 200 further comprises a spring piston 201, having a first side 203*a* and a second side 203*b*, wherein spring piston 201 is slidably and sealably (in the sense that gas or other fluids cannot pass from first side 203*a* to second side 203*b* via interface 213) disposed within spring tube body 205 over a travel 293 along axis of reciprocation 291. In this illustrative example, at least second side 203*b* of spring piston 201 is connected to plunger tube 215, which is slidably moveable along axis of reciprocation 291 and connected to spring tube body 205 along a gasket or O-ring providing sealed interface 217. In this non-limiting example, an exterior end of plunger tube 215 comprises a second eyelet or trunnion 219, by which suspension apparatus is, depending on which of the suspended mass or wheels of the vehicle eyelet or trunnion 209 is connected to, pivotably connected to the other of the suspended mass of the vehicle or the wheel(s) of the vehicle. Skilled artisans will appreciate that, in lieu of eyelets and trunnions 209 and 219, the ends of suspension apparatus 200 may be connected to the sprung and unsprung masses of the vehicle by other connective components that are flexible, pivotable, or substantially rigid. In other words, suspension apparatus 200 is generally compatible with suspension attachment systems known in the art.

As shown in the illustrative example of FIG. 2, plunger tube 215 contains a separator piston 221, which, in this illustrative example, comprises a floating piston slidably and sealingly retained within plunger tube 215, and which bounds a damper gas chamber 223 containing a volume of pressurized gas exerting an upward pressure on separator piston 221. In certain embodiments, the combined action of separator piston 221 and damper gas chamber 223 operate to maintain a pressure differential between first side 227*a* of damper piston 225 and second side 227*b* of damper piston 225. As shown in the explanatory example of FIG. 2, first side 227*a* of damper piston 225, bounds a first damper chamber 229 and second side 227*b* of damper piston 225 bounds a second damper chamber 231. Both first damper chamber 229 and second damper chamber 231 are filled with a damper fluid (for example, ~7 weight oil), and at least one flow restriction circuit 233 permits restricted fluid communication between first damper chamber 229 and second damper chamber 231. In some embodiments, at least one flow restriction circuit 233 comprises a hole, or other orifice within damper piston 225 through which damper fluid can pass. In some embodiments, at least one flow restriction circuit 233 comprises multiple circuits (for example, high and low speed damping, or a separate rebound damping circuit). As shown in FIG. 2, second side 227*b* of damper piston 225 is connected to one end of damper shaft 235, with the opposite end of damper shaft 235 connected to first end 207*a* of spring tube body 205. Thus, the motion (for example, the motion of first eyelet/trunnion 209 relative to second eyelet/trunnion 219 of suspension apparatus 200) is subject to both a spring force generated by the gas chambers within spring tube body 205, and damping forces created by pushing suspension fluid through at least one flow restriction circuit 233. Skilled artisans will appreciate that, because the damper system is under pressure and operates in parallel with the gas spring of suspension apparatus, it contributes slightly to the overall spring curve of suspension apparatus 200. However, the behavior and contours of the spring curve of suspension apparatus 200 are primarily determined by the forces exerted by the gases in primary positive gas spring chamber 237, primary negative gas spring chamber 239 and secondary negative gas spring chamber 241 upon spring piston 201.

Referring to the non-limiting example of FIG. 2, spring tube body 205 further comprises a primary positive gas spring chamber 237 comprising a volume of gas (for example, air) under pressure in a chamber bounded, in part by the internal bore of spring tube body 205 and first side 203*a* of spring piston 201. Spring tube body 205*a* further comprises a primary negative gas spring chamber 239 bounded in part by second side 203*b* of spring piston 201 and the internal bore of spring tube body 205. In certain embodiments, primary positive gas spring chamber 237 and primary negative gas spring chamber 239 are never in fluid pressure communication. As used in this disclosure, the expression "fluid pressure communication" refers to the state where the pressures across two chambers can be communicated between the chambers to achieve an equilibrium state. According to some embodiments, fluid pressure communication can be effected through direct fluid communication, wherein gas in a higher-pressure chamber moves to a lower pressure chamber until both chambers are at a common equilibrium pressure. According to various embodiments, fluid pressure communication can be effected through mechanical means, such as by an internal floating piston ("IFP") between chambers, whose position moves (thereby changing the relative effective volumes of the two chambers) until either an equilibrium pressure between the chambers is achieved, or the IFP reaches the end of its travel.

According to various embodiments, suspension apparatus 200 further comprises a secondary negative gas spring chamber 241, which is in selective fluid communication with primary negative gas spring chamber 239 via separator 243, which is disposed between secondary negative gas spring chamber 241 and primary negative gas spring chamber 239. In the explanatory example of FIG. 2, secondary negative gas spring chamber 241 is provided in a separate housing from spring tube body 205, in a configuration having an outward appearance analogous to a piggyback shock, wherein damper gas chamber 223 and separator piston 221 are disposed away from the main body of the shock, to avoid unwanted variations in the damping characteristics of the shock due to heat buildup changing the pressure within damper gas chamber 223. Other configurations for secondary negative gas spring chamber 241 are possible and within the contemplated scope of this disclosure.

Referring to the explanatory example of FIG. 2, separator 243 is configured to permit fluid communication between secondary negative gas spring chamber 241 and primary negative gas spring chamber 239 over a first portion 245 of spring piston's 201's travel 293. According to certain embodiments, first portion 245 of spring piston 201's travel coincides with a portion of suspension apparatus's spring curve, that, but for selective fluid pressure communication between primary negative gas spring chamber 239 and secondary negative gas spring chamber 241, would exhibit the disproportionately high, varying initial spring rate described with reference to FIGS. 1D and 1G. In some embodiments, first portion 245 comprises at least part of the initial travel (for example, initial stroke 190 in FIG. 1G) of spring piston 201. In some embodiments, first portion 245 further comprises a portion of the mid-stroke (for example, mid-stroke 191 in FIG. 1G) of spring piston 201.

According to certain embodiments, separator 243 is further configured to prevent fluid pressure communication over a second portion 247 of spring piston 201's travel 293. According to various embodiments, second portion 247 occupies a latter portion of travel 293, which begins after first portion 245 ends. In some embodiments, second portion 247 includes at least part of middle (for example, mid-stroke 191 in FIG. 1G) of travel 293, and at least part, or all, of the end (for example, end stroke 192) of travel 293. Depending on embodiments, travel 293 may further comprise portions lying outside of either first portion 245 or second portion 247.

In certain embodiments, separator 243 comprises an IFP between secondary negative gas spring chamber 241 and primary negative gas spring chamber 239 that moves during first portion 245, thereby permits reciprocal expansion of secondary negative gas chamber 241 with primary negative gas spring chamber 239, but which reaches the end of its travel at the end of first portion 245, thereby beginning second portion 247.

In some embodiments, separator 243 comprises a valve which is held open during first portion 245, thereby permitting direct fluid communication between primary negative gas spring chamber 239 and secondary negative gas spring chamber 241. In some embodiments where separator 243 is a valve, the valve may be electrically actuated, such as by a solenoid, to switch between permitting and preventing fluid communication. In certain embodiments, where separator 243 is a valve, the valve may be mechanically actuated. Other embodiments, such as where separator 243 comprises a bladder or other membrane of limited elasticity, are possible and within the contemplated scope of this disclosure.

As discussed in greater detail with reference to FIGS. 4A-4B and FIG. 5 of this disclosure, during first portion 245, fluid pressure communication between primary negative gas spring chamber 239 and secondary negative gas spring chamber 241 increases the effective volume of primary negative gas spring chamber 239. In this way, the initial bias toward a significantly larger expansion ratio of the negative gas spring chambers relative to the compression ratio of the positive gas spring chamber of suspension apparatus 200 is, at a minimum, reduced, and in some cases, eliminated, or reversed (i.e., the initial effective volume of primary negative gas spring chamber 239 is greater than the initial volume of primary positive gas spring chamber 237). By implication, by providing a larger effective negative gas spring chamber volume during a first portion 245, thereby shifting the initial bias in expansion ratio to compression ratio, the disproportionately large and variable spring rate (for example, as shown over period 194 in FIG. 1G) of certain gas springs at the start of their travel can be substantially reduced or eliminated, and suspension apparatus according to various embodiments of this disclosure can provide a substantially linear spring curve throughout the initial stroke of the suspension apparatus, as well as through a tunable portion of the mid-stroke where a progressive increase in spring rate is not yet necessary.

While not shown in FIG. 2, further embodiments are possible and within the scope of this disclosure. For example, primary positive gas spring chamber 237 may contain one or more removable volumetric spacers (sometimes referred to as "tokens") for tuning the ramp-up in spring rate in the latter portions of the travel of suspension apparatus 200. In certain embodiments, suspension apparatus 200 may contain an equalization mechanism permitting fluid communication between primary positive gas spring chamber 237 and primary negative gas spring chamber 239 at a point in travel 293 proximate to the start point of travel 293. In some embodiments, one or more gas spring chambers of suspension apparatus 200 may comprise a volume of adsorptive material, such as activated carbon, which selectively retains and releases air molecules in response to changes in pressure, thereby changing the effective volume of the chamber containing the adsorptive material. In some embodiments, the equalization mechanism is a divot or notch in the internal bore of spring tube body 205 which provides a transient break in the seal between spring piston 201 and spring tube body 205, thereby equalizing the pressurization between primary positive gas spring chamber 237 and primary negative gas spring chamber 239. In some embodiments, the equalization mechanism comprises a valve (such as used in the FOX FLOAT series) which permits fluid flow through spring piston 201. Additionally, in certain embodiments, spring tube body 205 may also contain top-out and/or bottom-out bumpers. Further, in embodiments where separator 243 comprises an IFP, suspension apparatus 200 may further comprise a charging valve, which, when pressed, permits fluid communication between primary negative gas spring chamber 239 and secondary negative gas spring chamber 241. In this way, the charging valve can be used to both pressurize secondary negative gas spring chamber 241, and to re-equalize the pressure between primary negative gas spring chamber 239 and secondary negative gas spring chamber (for example, after a user has reset their overall spring pressure via valve 211). According to certain embodiments, the IFP in separator 243 is supported on both sides by a set of light preload springs, which define an initial position of the IFP, such that the IFP is positioned at an initial position when the charging valve is opened to equalize the pressure between the primary and secondary negative gas spring chambers.

FIGS. 3A-3D illustrate four views of a vertically oriented suspension apparatus 300 providing selective fluid communication according to various embodiments of this disclosure. For convenience of cross-reference, elements common to more than one of FIGS. 3A-3D are numbered similarly.

Referring to the non-limiting example of FIGS. 3A-3D, in some embodiments, suspension apparatus 300 comprises the spring cartridge of a suspension fork and is proportioned to be at least partially contained within a reciprocating leg (for example, within one or both of a stanchion or lower) of the fork. In some embodiments, (for example, in a linkage, or trailing arm suspension fork), suspension apparatus 300 is configured to be retained at least in part within a fixed portion of the leg and actuated by a linkage mechanism.

According to various embodiments, suspension apparatus 300 comprises a spring tube body 301, comprising a section of material (for example, aluminum, magnesium, or steel) with a smooth inner bore 303, and comprising a first end 305. A top cap 307 may be sealably attached (for example, via a screw thread and one or more gaskets or O-rings) to first end 305 of spring tube body 301 to form a fluid tight end to spring tube body 301. In some embodiments, a valve assembly 309 (for example, a Schrader-style air valve) is incorporated into top cap 307. Further, first end 305 of spring tube body 301 is configured to interface with a load-bearing member of the fork (for example, a fork crown or top of a fork stanchion) capable of applying a compressive force along axis of reciprocation 313 upon spring tube body 301.

In certain embodiments, suspension apparatus 300 further comprises a lower bulkhead 311 disposed at a second end 315 of spring tube body 301. According to some embodiments, lower bulkhead 311 is sealably connected to spring tube body 301 (for example, via screw threads and one or more gaskets or O-rings). In some embodiments, lower bulkhead 311 is integral with spring tube body 301 (i.e., most of the components of suspension apparatus 300 are installed by removing top cap 307 and lowered in through first end 305 of spring tube body 301).

Figure 3A:
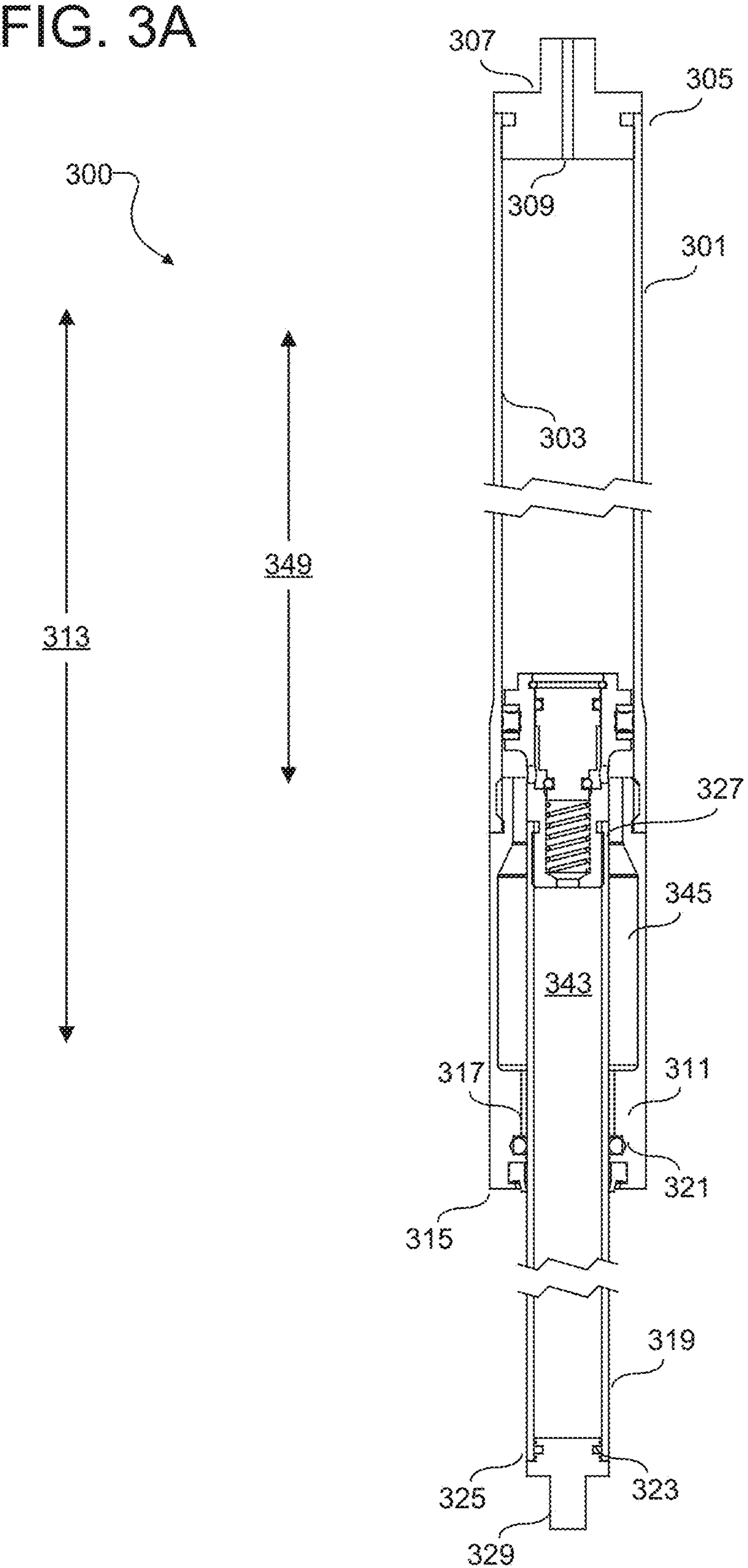
FIGS. 3A-3D illustrate, in cutaway view, an example of a suspension apparatus according to various embodiments of this disclosure.
Figure 3B:
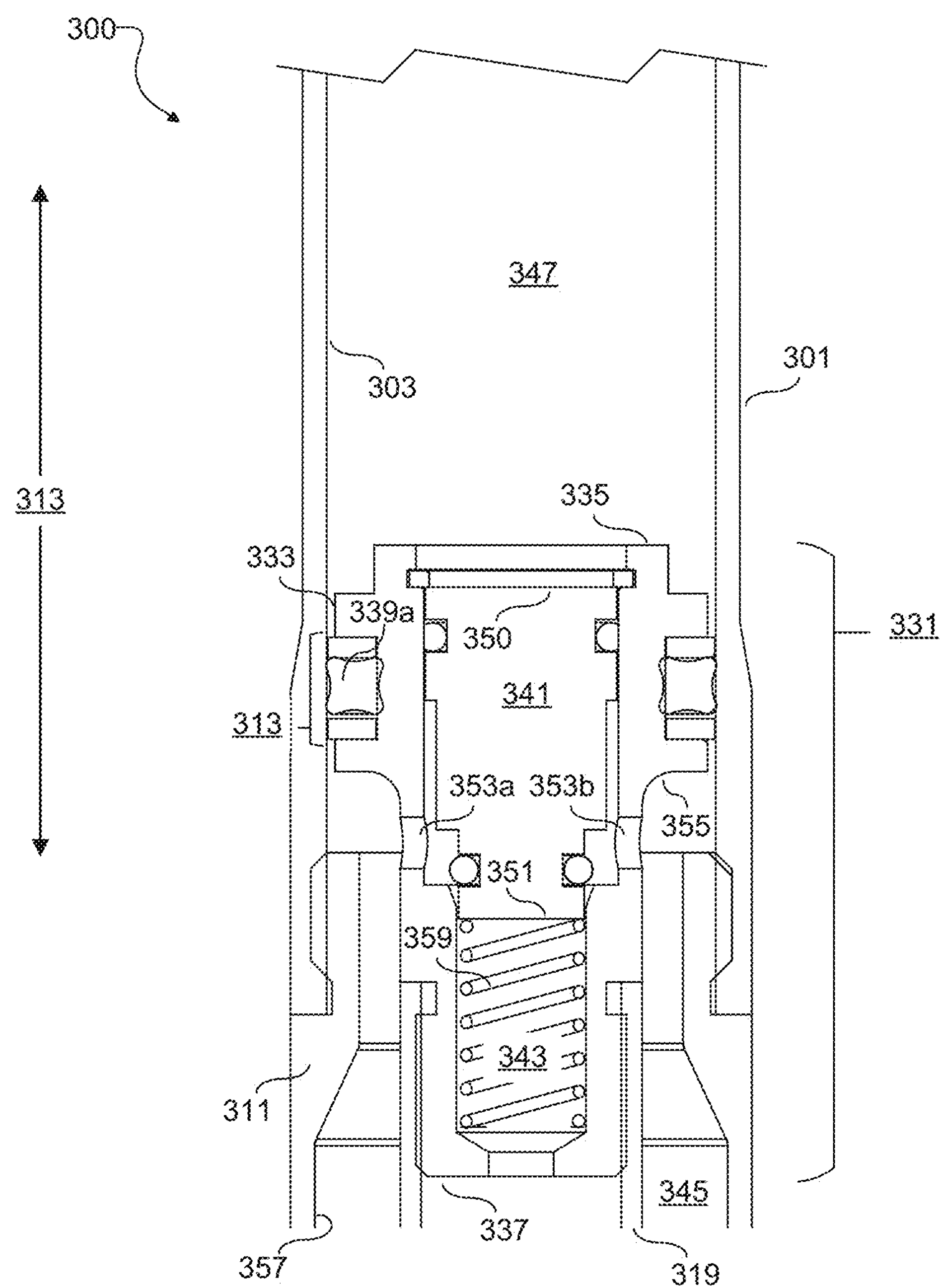
Figure 3C:
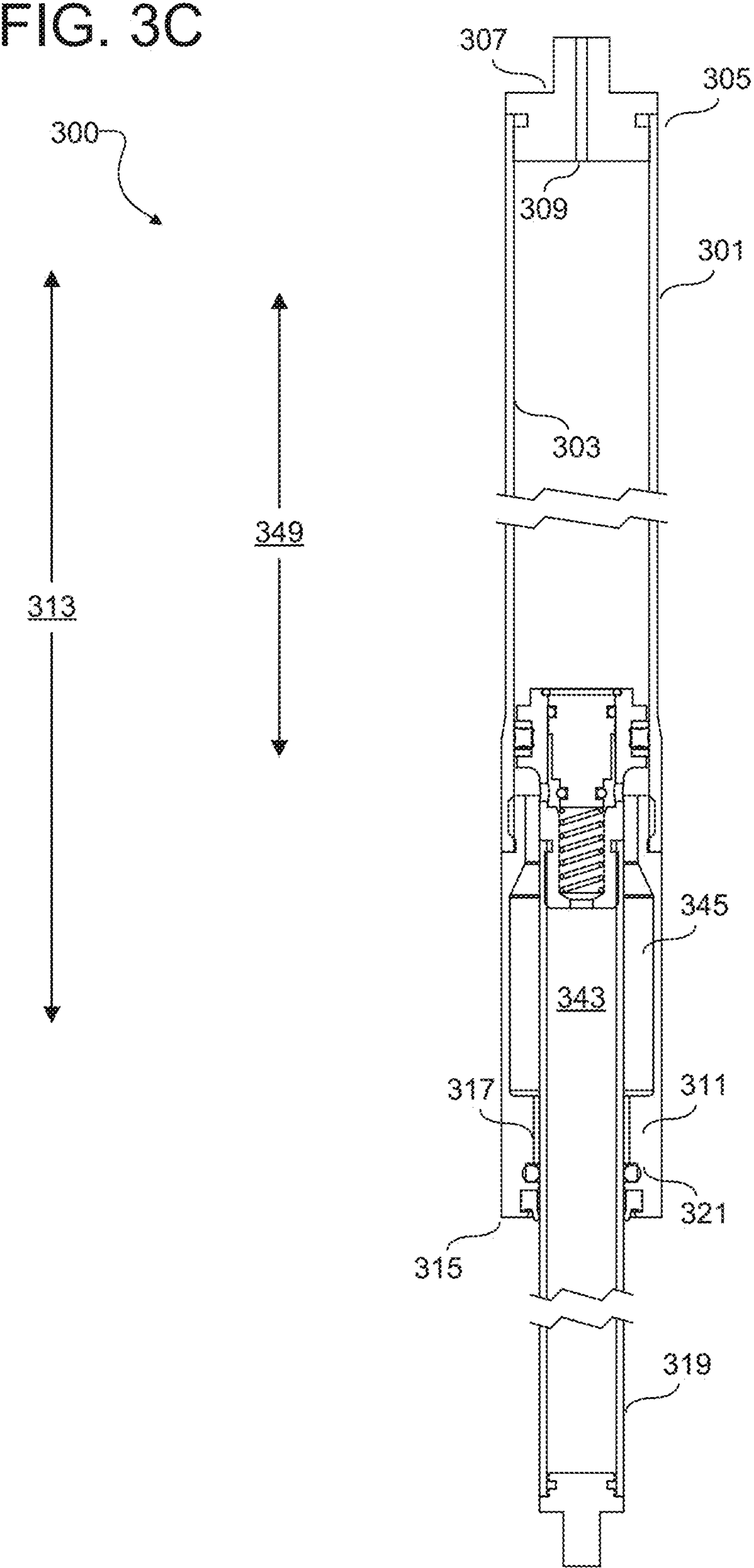

Referring to the illustrative example of FIGS. 3A and 3C, in some embodiments, a guide bushing 317 (for example, a brass or polymer bushing) is disposed within lower bulkhead 311 and piston shaft 319. Further, a sliding seal 321 (for example, one or more O-rings or gaskets) is disposed within lower bulkhead 311. Together, guide bushing 317 and sliding seal 321 provide a slidable, sealed interface along which piston shaft 319 can move relative to spring tube body 301 along axis of reciprocation 313 with limited slop (as used in this disclosure, the expression "slop" encompasses unwanted, off-axis movement of piston shaft 319 or lower bulkhead 311 relative to each other).

According to various embodiments, piston shaft 319 comprises a hollow section of material (for example, steel, aluminum, magnesium, or alloys thereof) having a first end 325 and a second end 327. In certain embodiments, first end 325 is sealed via a foot stud 329. According to various embodiments, foot stud 329 provides a hard point for securely attaching one end of suspension apparatus 300 to a further portion of a suspension component (such as a fork lower) to which an axle carrying one or more wheels of a suspended vehicle is attached. In some embodiments, foot stud 329 comprises a first set of threads 323 to connect to piston shaft 319, and a second set of threads to anchor suspension apparatus to a slider or other hard point, such that suspension apparatus 300 can be compressed and exert a spring force to the suspension fork.

According to various embodiments, second end 327 of piston shaft 319 is connected to a piston assembly 331. As shown in the illustrative examples of FIGS. 3A-3D piston assembly 331 comprises a main piston body 333 defining at least part of a first end 335 and a second end 337 of main piston body 333. In the non-limiting example of FIGS. 3A-3D, main piston body 333 is slidably and sealingly connected to inner bore 303 of spring tube body along an interface 339, comprising one or more moving seals (for example, metal or rubber rings) **339*a* disposed between piston assembly 331 and inner bore 303. Piston assembly 331 further comprises a hollow center portion holding a separator 341, which is sealingly and slidably held within main piston body 333, and by moving relative to main piston body 333 along axis of reciprocation 313 operates to permit and prevent direct fluid communication between secondary negative gas spring chamber 343 and primary negative gas spring chamber 345. In the illustrative example of FIGS. 3A and 3B, separator 341 is shown in a "down" position arising at a second (typically, mid to latter) portion of the travel 349 of piston assembly 331 within spring tube body 301**.

As shown in the explanatory example of FIGS. 3A-3D, separator 341 comprises a first side 350 and a second side 351. In some embodiments, first side 350 of separator 341 and first end 335 of main piston body 333 comprise a first side of a piston which bounds primary positive gas spring chamber 347. In this illustrative example, primary positive gas spring chamber 347 is further bounded by a portion of inner bore 303 of spring tube body 301 and top cap 307. According to various embodiments, main piston body 333 further comprises one or more side ports **353*a* and 335*b*, defining part of a fluid pathway between secondary negative gas spring chamber 343 and primary negative gas spring chamber 345. As previously noted, in the illustrative example of FIGS. 3A-3B separator 341 is in a "down" position, wherein separator 341 prevents direct fluid communication between secondary negative gas spring chamber 343 and primary negative gas spring chamber 345. In this example, secondary negative gas spring chamber 343 is bounded by second side 351 of separator 34, second end 337 of main piston body 333, the interior walls of piston shaft 319 and foot stud 329, though other configurations are possible and within the intended scope of this disclosure. In this illustrative example, primary negative gas spring chamber 345 is bounded a lower side 355 of main piston body 333 and the interior surfaces 357 of lower bulkhead 311**.

According to various embodiments, for at least two portions of travel 349, there is no fluid pressure communication between primary positive gas spring chamber 347 and primary negative gas spring chamber 345. That said, in some embodiments, suspension apparatus 300 may include an equalization mechanism for equilibrating, or eliminating a pressure differential across piston assembly 331, thereby causing the spring curve of suspension apparatus 300 to pass through the origin. In other words, the spring curve is such that, next to no force is required to initiate displacement of piston assembly 331 within spring tube body 301.

Figure 3D:
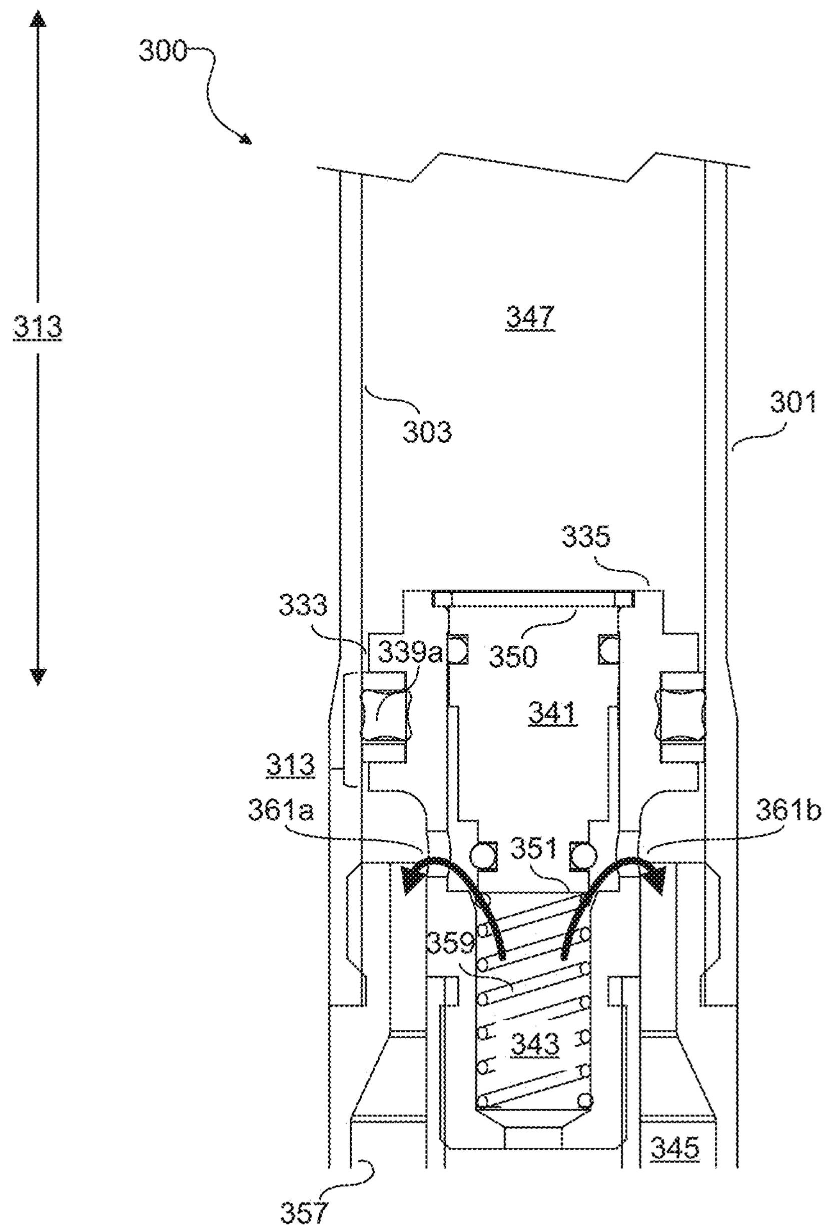

As previously noted, in the example of suspension apparatus 300, the position of separator 341 relative to main piston body 333 determines whether there is fluid pressure communication by means of direct fluid communication between primary negative gas spring chamber 345 and secondary negative gas spring chamber 343. The position of separator 341 depends on the magnitude of the force upon first side 350 of separator 341 relative to the force in the opposite direction exerted upon second side 351 of separator 341. In the illustrative example of FIGS. 3A-3D, the force exerted upon first side 350 of separator 341 is a function of the fluid pressure within primary positive gas spring chamber 347 and the surface area of first side 350 of separator 341. In this example, the gas pressure within primary positive gas spring chamber 347 exerts a force pushing separator downwards (i.e., towards foot stud 329) along axis of reciprocation 313. A force in the opposite direction is applied to second side 351 of separator 341 from pressure within, at a minimum, secondary negative gas spring chamber 343. It should be noted, that, when separator 341 is in the "up" position (such as shown in FIGS. 3C and 3D), there is fluid communication between primary negative gas spring chamber 345 and secondary negative gas spring chamber 343, and the gas pressure exerted to second side 351 of separator 341 is from the shared volume of the two negative gas spring chambers. In certain embodiments, the force applied to second side 351 of separator 341 may further comprise a force applied by a force adjusting device 359. According to various embodiments, force adjusting device 359 operates to change the point in the travel 349 at which separator 341 moves between the "up" and "down" positions. In this example, force adjusting device 359 comprises a coil spring with an adjustable preload. However, other embodiments are possible and within the contemplated scope of this disclosure.

According to certain embodiments, during a first portion of travel 349 of suspension apparatus 300, typically in the initial (for example, during some or all of initial stroke 190 in FIG. 1G) portion of travel 349, and in some embodiments, some portion or all of the intermediate portion of travel 349 (for example, during mid-stroke 191 in FIG. 1G), the force exerted upon first side 350 of separator 341 due to the pressure of gas in primary positive gas spring chamber 347 is less than the force exerted upon second side 351 of separator 341 due to the pressure in the shared volume of secondary negative gas spring chamber 343 and primary negative gas spring chamber 345, and, where applicable, force adjusting device 359. During this first portion of travel 349, gas can move between primary negative gas spring chamber 345 and secondary negative gas spring chamber 343 through side ports 353*a* and 353*b*, as shown by flow arrows 361*a* and 361*b* in FIG. 3D. Depending on the design parameters, the size of side ports 353*a* and 353*b* can be tuned such that the side ports 353*a* and 353*b* are damping apertures, constricting the passage of gas between the primary and secondary gas chambers. In some embodiments, this additional damping within suspension apparatus 300 can be a useful adjunct to another damping force, such as provided by a damper cartridge.

According to various embodiments, as suspension apparatus 300 is compressed and piston assembly 331 travels further into spring tube body 301, causing primary positive gas spring chamber 347 to reduce in volume, and by implication, the pressure exerted by the gas in primary positive gas spring chamber 347 upon piston assembly 331 to increase, and by the same token, the combined volume of primary negative gas spring chamber 345 and secondary negative gas spring chamber 343 to increase in volume, and by implication, the gas pressure upon the lower side of piston assembly 331 to decrease. At a point marking the start of a second portion of travel 349, suspension apparatus 300 is compressed to the point where the downward force upon separator 341 from the gas in primary positive gas spring chamber 347 is equal to, and then greater than, the upward force upon separator 341 from the negative gas spring chambers and, where applicable, force adjusting device 359. As shown in the illustrative examples of FIGS. 3A-3B, this shift in the relative magnitudes of the forces acting upon separator 341 drives the separator into a "down" position, wherein fluid communication between primary negative gas spring chamber 345 and secondary negative gas spring chamber 343 is prevented by separator 341. When this happens, the effective negative gas spring chamber volume of suspension apparatus goes from being the sum of the volume of primary negative gas spring chamber 345 and secondary negative gas spring chamber 343, to just the volume of primary negative gas spring chamber 345. As will be described in greater detail with reference to FIG. 5 of this disclosure, by moving separator 341 from a first position permitting fluid pressure communication between the primary and secondary negative gas spring chambers over a first portion of travel 349 to a second position preventing fluid pressure communication between the negative gas spring chambers, allows certain embodiments according to this disclosure to provide the performance benefits of a substantially more linear initial and mid-stroke spring curve relative to a traditional gas spring, such as described with reference to FIGS. 1D-1F of this disclosure, while retaining the end-stroke progressive ramp-up of an air spring. In this way, certain embodiments according to this disclosure offer both the desirable performance characteristics of traditional coil springs and of traditional gas springs, while retaining the weight savings and ready tunability of a gas spring.

Certain embodiments of suspension apparatus 300 may include additional components beyond those shown in the illustrative examples of FIGS. 3A-3D. For example, top-out or bottom-out bumpers may be disposed within spring tube body 301. Further, consistent with embodiments according to this disclosure retaining the tunability of tradition gas springs, one or more volumetric spacers may be disposed in primary positive gas spring chamber 347 for tuning the end-stroke ramp-up provided by suspension apparatus 300. Additionally, in some embodiments, top cap 307 may be replaced with a ramp control device (for example, an MRP Ramp Control cartridge). Further, depending on embodiments, suspension apparatus 300 may further comprise a secondary positive gas spring chamber for further mid-to-late-stroke spring curve tuning.

Figure 4A:
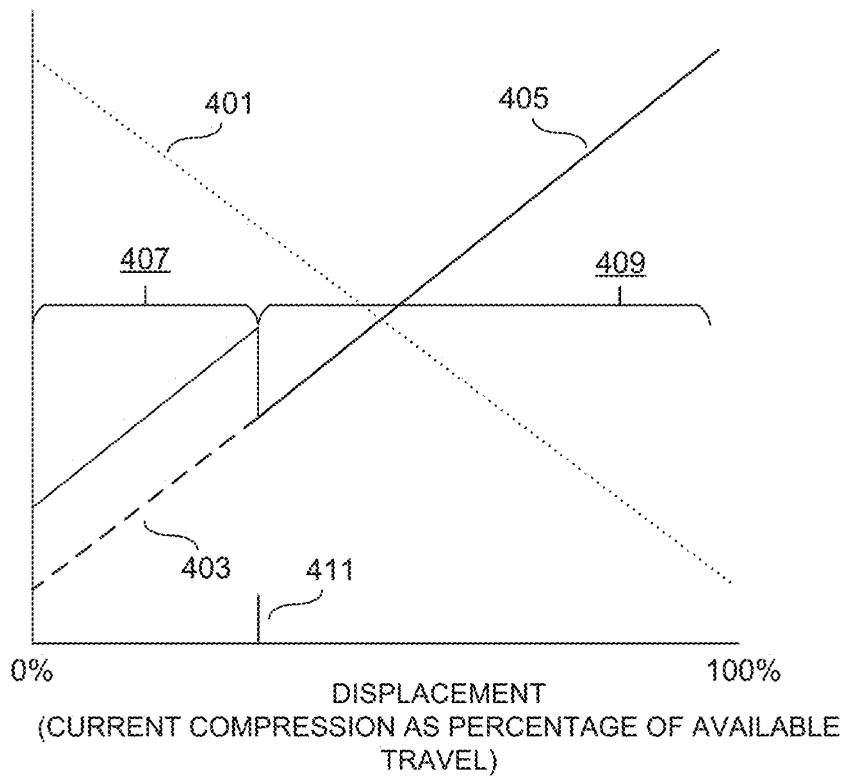
FIGS. 4A and 4B illustrate aspects of the relationship between certain gas spring chamber volumes and displacement, according to various embodiments of this disclosure.
Figure 4B:
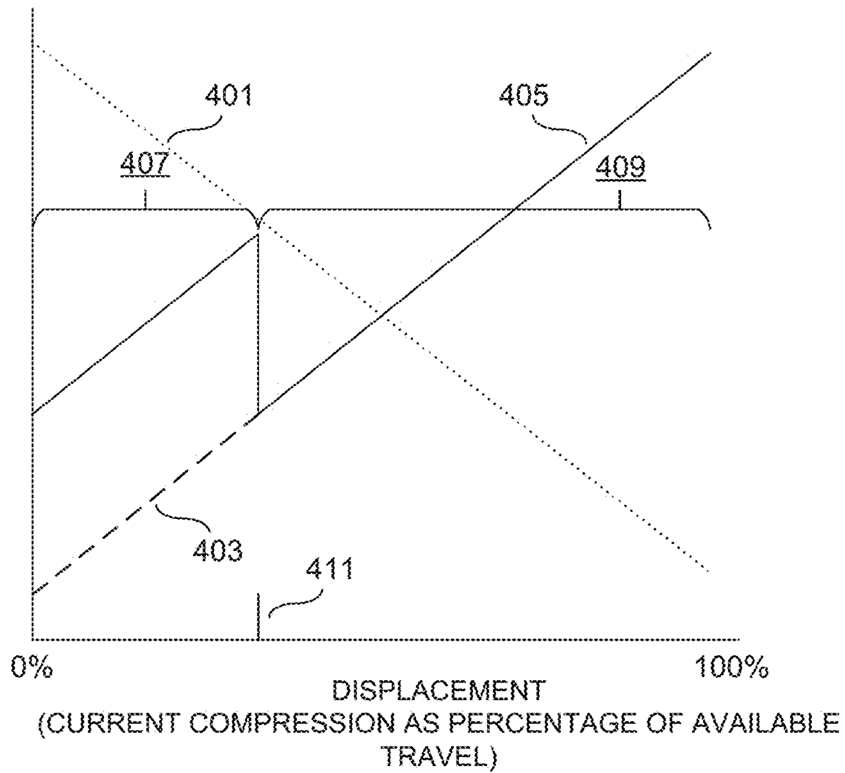

FIGS. 4A and 4B illustrate examples relationships between spring chamber volumes and displacement in suspension apparatus in certain embodiments according to this disclosure. For ease of cross-reference, elements common to both FIGS. 4A and 4B are identified with the same reference numbers.

Referring to the non-limiting example of FIG. 4A, a first graph shows the relationships between chamber volumes of a suspension apparatus according to certain embodiments of this disclosure (for example, suspension apparatus 200 in FIG. 2 or suspension apparatus 300 in FIGS. 3A-3D) relative to displacement expressed as a percentage of compression over a designated travel (for example, travel 349). By way of illustrative example, for a suspension apparatus with a travel of 100 mm, zero percent displacement correlates to full extension of the suspension apparatus. In this example, applying a compressive force sufficient to push a spring piston (for example, spring piston 201 in FIG. 2) 100 mm from its starting point correlates to 100% displacement. Skilled artisans will appreciate that, in some cases, the travel of the system reflects a recommended range of operation and does not necessarily correlate to the maximum possible range of compression of the system.

FIGS. 4A & 4B illustrate three relationships between displacement and chamber volume for a suspension apparatus comprising a primary positive gas spring chamber (for example, primary positive gas spring chamber 237 in FIG. 2), a primary negative gas spring chamber (for example, primary negative gas spring chamber 239 in FIG. 2) and a secondary negative gas spring chamber (for example, secondary negative gas spring chamber 241 in FIG. 2), which is in selective fluid pressure communication with the primary negative gas spring chamber via a separator (for example, separator 243 in FIG. 2 or separator 341 in FIG. 3B). In some embodiments, fluid pressure communication between the negative gas chambers is achieved through direct fluid communication (for example, as in suspension apparatus 300 in FIG. 3). In some embodiments, selective fluid pressure communication is achieved volumetrically, such as via a floating piston between the primary and secondary negative gas chambers.

In FIG. 4A, three plots are shown. A first plot 401 (shown as a dotted line) shows the volume of the primary positive gas spring chamber as a function of displacement. A second plot 403 (shown as a dashed line) shows the volume of the primary negative gas spring chamber as a function of displacement. A third plot 405 (shown as a solid line) shows the effective negative gas spring chamber volume as a function of displacement. As used in this disclosure, the expression "effective negative gas spring chamber" refers to the volume of gas whose pressure exerts a force on a spring piston (for example, spring piston 201 in FIG. 2 or piston assembly 331 in FIGS. 3A-3D) opposing the force created by pressure in the positive gas spring chamber.

In certain embodiments according to the present disclosure, by providing selective fluid communication between a primary negative gas spring chamber and a secondary negative gas spring chamber over a first portion 407 of the travel of a spring piston, the effective volume (as shown by plot 405) of the volume of gas whose pressure exerts a force upon in an opposite direction to the force exerted upon the gas piston by the volume of gas in the primary positive chamber is effectively larger. By increasing the effective volume of the negative gas spring chamber, the fractional change of the volume of the negative gas spring chamber is reduced. By way of illustrative example, consider a system in which the primary negative gas spring chamber has an initial volume of 1 $cm^3$, and the secondary negative gas spring chamber has a volume of 3 $cm^3$. In the absence of selective fluid pressure communication from a secondary negative gas spring chamber, expanding the negative gas spring chamber to 2 $cm^3$, doubles the volume, and halves the pressure the gas in the negative gas spring chamber exerts on a side of a spring piston opposite to the primary positive gas spring chamber. However, in the situation where there is selective fluid pressure communication between the primary negative gas spring chamber and secondary negative gas spring chamber, the initial effective negative chamber volume is now 4 $cm^3$. In this case, compression of the positive gas spring chamber by 1 $cm^3$ results in a reciprocal expansion of the primary negative gas spring chamber by 1 $cm^3$, and the total effective negative chamber volume is 5 $cm^3$. Accordingly, by increasing the effective initial volume of the negative gas spring chambers pressure exerted by the negative gas spring chambers upon the spring piston is decreased by only 20% (4 $cm^3$/5 $cm^3$) as a result of the initial 1 $cm^3$ expansion of the primary negative gas spring chamber at the beginning of the stroke. In this way, the lack of initial compliance and disproportionately large initial spring rate characteristic of gas springs with only a single negative gas spring chamber can be substantially reduced or eliminated, and the suspension apparatus can provide a less variable initial spring rate.

As discussed elsewhere in this disclosure, coil springs and traditional gas springs present a tradeoff in terms of their dynamic ranges, and the portions of the stroke over which each type of spring performs best. Typically, gas spring users exchange early stroke responsiveness and spring curve linearity for progressively increasing end-stroke support. Certain embodiments according to this disclosure provide selective fluid pressure communication between the primary and secondary negative gas spring chambers, and as such, allow users to retain the desirable end-stroke support properties of traditional gas springs. As used in this disclosure, the term "selective," as used in the context of fluid pressure communication, encompasses the property of the fluid pressure communication only being provided over a defined portion of the travel of the spring piston. Referring to the non-limiting example of FIG. 4A, at a given displacement 411, the separator between the primary negative gas spring chamber and the secondary negative gas spring chamber moves from an open position, where fluid pressure communication is permitted, to a closed position, where the separator prevents fluid pressure communication. When the separator is fully moved to the closed position, the effective negative gas spring chamber volume becomes that of the primary negative gas spring chamber, as shown by the discontinuous change in the effective gas spring chamber volume at displacement 411. While in the illustrative example of FIG. 4A, the change in effective negative gas spring chamber volume occurs almost instantaneously, resulting in the vertical component of plot 405 at displacement 411, embodiments according to this disclosure are not so limited, and in some embodiments, the separator may progressively open and close around the end of the first portion of the spring travel and the beginning of the second portion of the spring travel, thereby eliminating the discontinuity at displacement 411.

FIG. 4B illustrates a further example of plots of primary positive gas spring chamber, primary negative gas spring chamber, and effective negative gas spring chamber volumes relative to displacement to illustrate that secondary negative gas spring chamber volume can be a tunable parameter. For example, in suspension apparatus (for example, suspension apparatus 300 in FIGS. 3A-3D) where selective fluid pressure communication is provided by direct fluid communication between the positive and negative gas spring chambers, the volume of the secondary gas spring chamber can be tuned through the addition or removal of volumetric spacers (i.e., tokens) in the secondary gas spring chamber. As another illustrative example, in certain suspension apparatus where the selective fluid pressure communication is provided volumetrically, or without direct fluid communication between the positive and negative gas spring chambers, the volume of the secondary negative gas spring chamber may be tuned by changing the initial position of a floating piston separating the negative gas spring chambers. Similarly, the point in the spring piston's travel (for example, displacement 411) can be similarly tuned by altering the volume of the secondary negative gas spring chamber.

Figure 5:
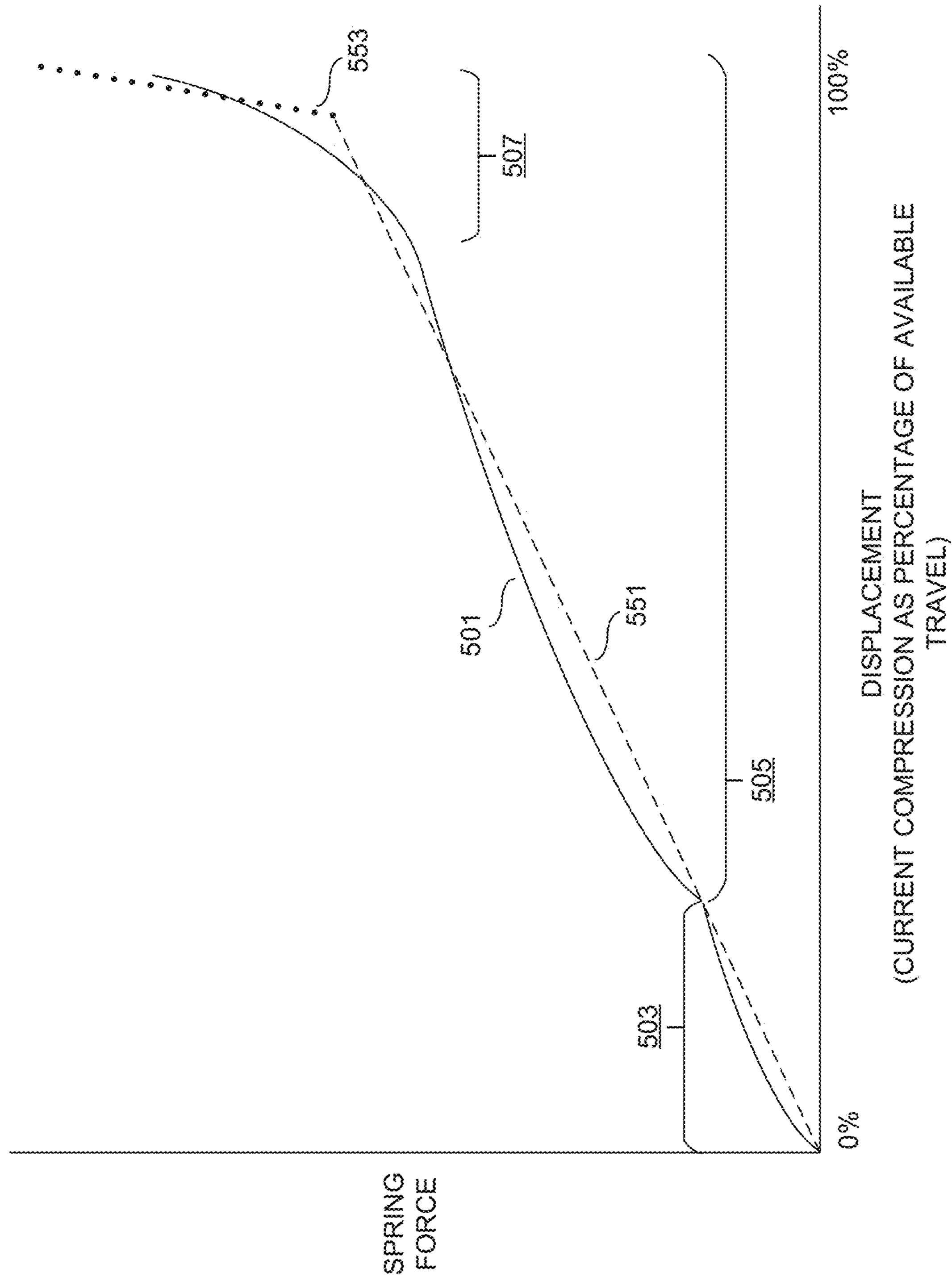
FIG. 5 illustrates an example of a spring curve provided by a suspension apparatus providing selective fluid pressure communication, according to some embodiments of this disclosure.

FIG. 5 illustrates an example of a spring curve of a suspension apparatus (for example, suspension apparatus 200 in FIG. 2 or suspension apparatus in FIGS. 3A-3D) according to certain embodiments of this disclosure, relative to a spring curve for a coil spring.

Referring to the illustrative example of FIG. 5—here, as in FIGS. 4A-4B, the horizontal axis represents displacement of a spring piston along its designated travel, or in other words, the percentage of the available compression which the suspension apparatus has used. The vertical axis represents a value of the spring force, or force resisting the compression, that the suspension apparatus exerts. Two spring curve plots are shown in FIG. 5. a first plot 501 illustrates an example of a spring curve for a suspension apparatus providing selective fluid pressure communication according to certain embodiments of this disclosure. A second plot 551, illustrates an example of a spring curve for a coil spring suspension apparatus (for example, coil spring unit 100 in FIG. 1A).

In the explanatory example of FIG. 5, the suspension apparatus whose spring curve is represented by first plot 501 has a separator which provides a binary switch between a fully open position during a first portion 503 of the travel of the suspension and a fully closed position during a second portion 505 of the travel of the suspension. As noted elsewhere in this disclosure, in certain embodiments, the separator provides a progressive transition between permitting fluid pressure communication and preventing fluid pressure communication between the primary and secondary negative gas spring chambers. As shown in the illustrative example of FIG. 5, during first portion of its travel, plot 501 approximately tracks that of plot 551, and most importantly, the disproportionately high and variable initial spring rate (as shown over period 194 in FIG. 1G) due to a large initial fractional expansion of a negative gas spring chamber has been eliminated. Further, over an initial part of second portion 505, plot 501 is substantially linearized (as compared to the spring curve over mid-stroke 191 in FIG. 1G). Consistent with the observed behavior of coil spring units, over an end stroke region 553, the linear relationship between displacement and spring force breaks down (for example, due to engagement of a bottom-out bumper or other mechanism to prevent over compression of the spring coils), as represented by the dotted line. In certain embodiments, further mid-stroke linearization of plot 501 may be achieved by tuning (for example, by changing the initial volumes of the primary positive gas spring chamber, primary negative gas spring chamber and secondary negative gas spring chambers relative to each other by adding or removing volumetric spacers). Still further mid-stroke linearization may be achieved by adding a secondary positive gas spring chamber in selective fluid pressure communication with primary positive gas spring chamber. However, over region 507, plot 501 exhibits an end-stroke ramp-up in spring rate, which, from a performance standpoint, is desirable, in that it avoids harsh bottoming out and unpredictable discontinuities in the spring force supporting the sprung mass of the vehicle.

Figure 6A:
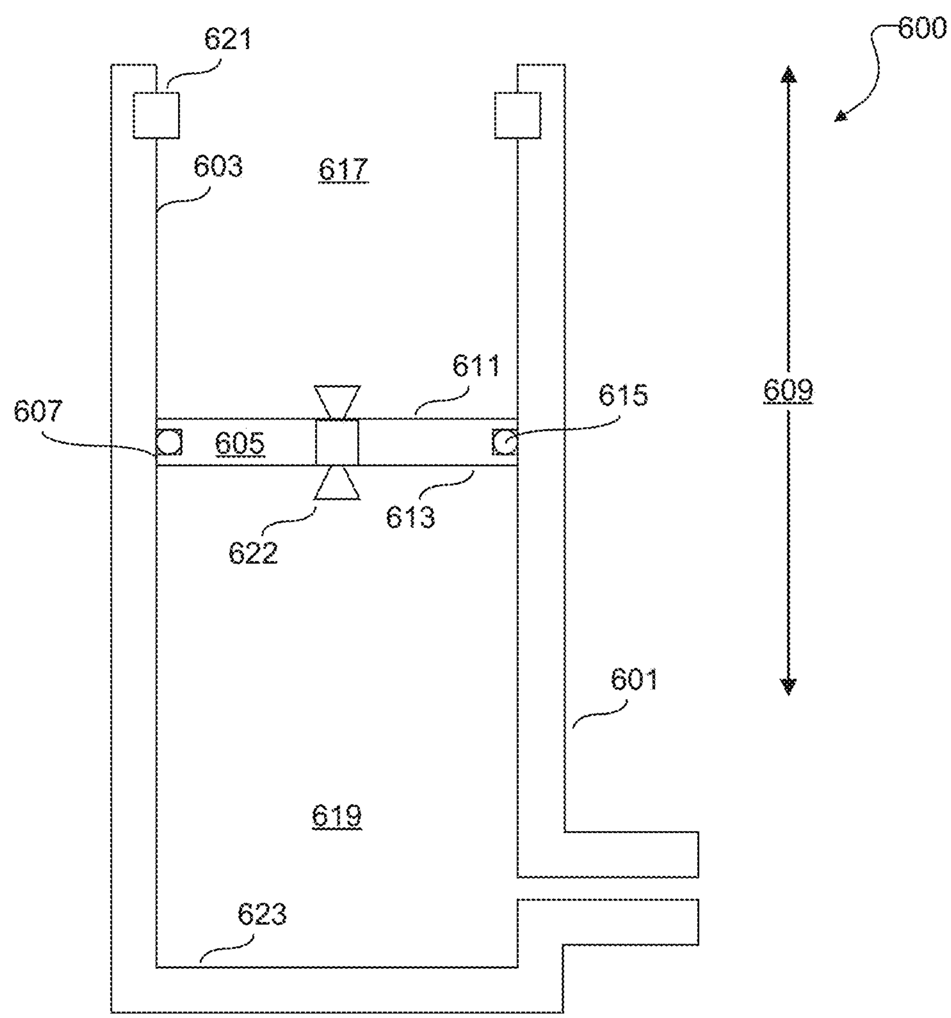
FIGS. 6A and 6B illustrate, in cutaway view, an example of a separator for providing selective fluid pressure communication according to certain embodiments of this disclosure.
Figure 6B:
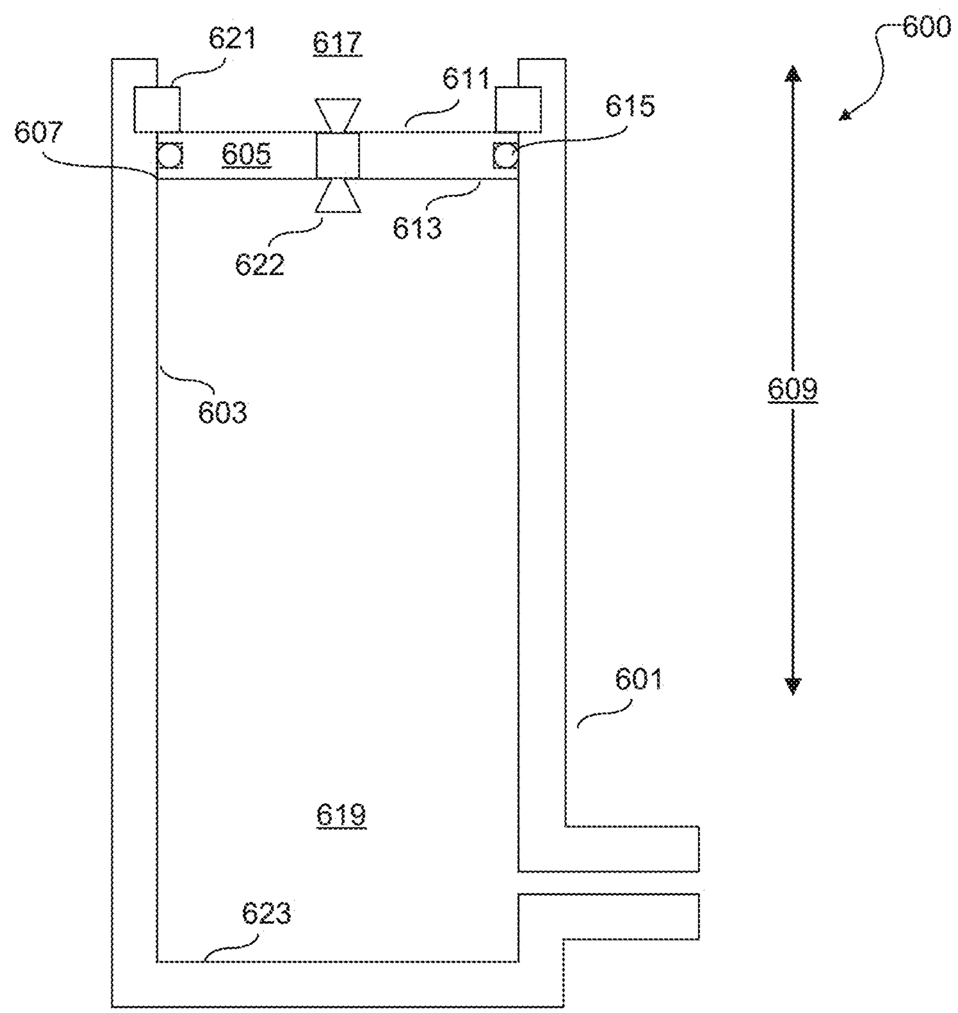

FIGS. 6A and 6B illustrate an example of a floating-piston type separator 600 suitable for use in suspension apparatus (for example, suspension apparatus 200 in FIG. 2) according to various embodiments of this disclosure. For convenience of cross-reference, elements common to both of FIGS. 6A and 6B are numbered similarly.

Referring to the illustrative example of FIGS. 6A-6B, separator 600 comprises a separator body 601, which is a hollow section of suitable material (for example, aluminum, magnesium, steel, carbon fiber or combinations thereof), defining an internal bore 603, which has a smooth surface upon which a separator piston 605 forms a slidable sealable interface 607. According to various embodiments, separator piston 605 is an internally floating piston ("IFP") of relatively low mass, which can translate along an axis of reciprocation 609 in response to forces caused by differences in gas pressure upon a first side 611 and a second side 613. In certain embodiments, separator piston 605 retains one or more sealing bodies 615 (for example, O-rings or gaskets) to prevent fluid communication (i.e., gas leakage across interface 607).

As shown in the non-limiting example of FIGS. 6A-6B, first side 611 of separator piston 605 bounds a first volume of pressurized gas 617, which, depending on the configuration of the suspension apparatus of which separator 600 is part, is part of a primary negative gas spring chamber, or in fluid communication with a primary negative gas spring chamber (for example, primary negative gas spring chamber 239 in FIG. 2). Similarly, second side 613 of separator piston 605 bounds a second volume of pressurized gas 619 which is part of, or in fluid communication with, a secondary negative gas spring chamber (for example, secondary negative gas spring chamber 241 in FIG. 2).

In certain embodiments, separator piston 605 further comprises a charging valve 622, which, when actuated (for example, by an external button) permits direct fluid communication between first volume of pressurized gas 617 and second volume of pressurized gas 619. According to various embodiments, the initial position of separator piston 605 can be set mechanically (for example, by a pair of preload springs on each side of separator piston 605), and charging valve 622 can be opened, thereby equalizing the pressure between the primary and secondary negative gas chambers. In this way, an initial equilibrium pressure equilibrium between the primary and secondary negative gas chambers can be achieved. Referring to the illustrative example of FIGS. 6A and 6B, separator 600 further comprises a first travel stop 621, which blocks the translation of separator piston 605 towards the primary negative gas spring chamber at a specified point along its travel, as shown in FIG. 6B. In certain embodiments, the position of first travel stop 621 may be adjustable. Further, in some embodiments, first travel stop 621 may be compressible or comprise a spring disposed within bore 603. By providing a progressively increasing force against separator piston 605, such embodiments of first travel stop 621 may eliminate a discontinuous transition between permitting and prohibiting fluid pressure communication between the first and second negative gas spring chambers. In this example, a bottom wall functions as a second travel stop 623, arresting the movement of separator piston 605 towards the secondary negative gas spring chamber at a second specified point in its travel.

During a first portion of the travel (for example, first portion 245) of a spring piston (for example, spring piston 201 in FIG. 2) of a suspension apparatus, separator piston 605, which is of relatively light weight and little friction with bore 603 can move freely within separator 600 along a travel bounded by first travel stop 621 and second travel stop 623. Thus, in the first portion of the travel of the spring piston, when the primary negative gas spring chamber expands, separator piston 605 is pushed up by the pressure of the gas in the secondary negative gas spring chamber. In other words, up until the point where separator piston 605's translation is stopped by first travel stop 621, the effective negative chamber volume of the suspension apparatus is volume of the secondary negative gas spring chamber plus the current volume of the primary negative gas spring chamber. However, and as shown in FIG. 6B, once the suspension apparatus is compressed, and by implication, the primary negative gas spring chamber has expanded such that the pressure in the secondary negative gas spring chamber pushes separator piston 605 against first travel stop 621, fluid pressure communication between the primary negative and secondary negative gas spring chambers ceases, and the effective negative chamber volume is that of the primary negative gas spring chamber.

Figure 7:
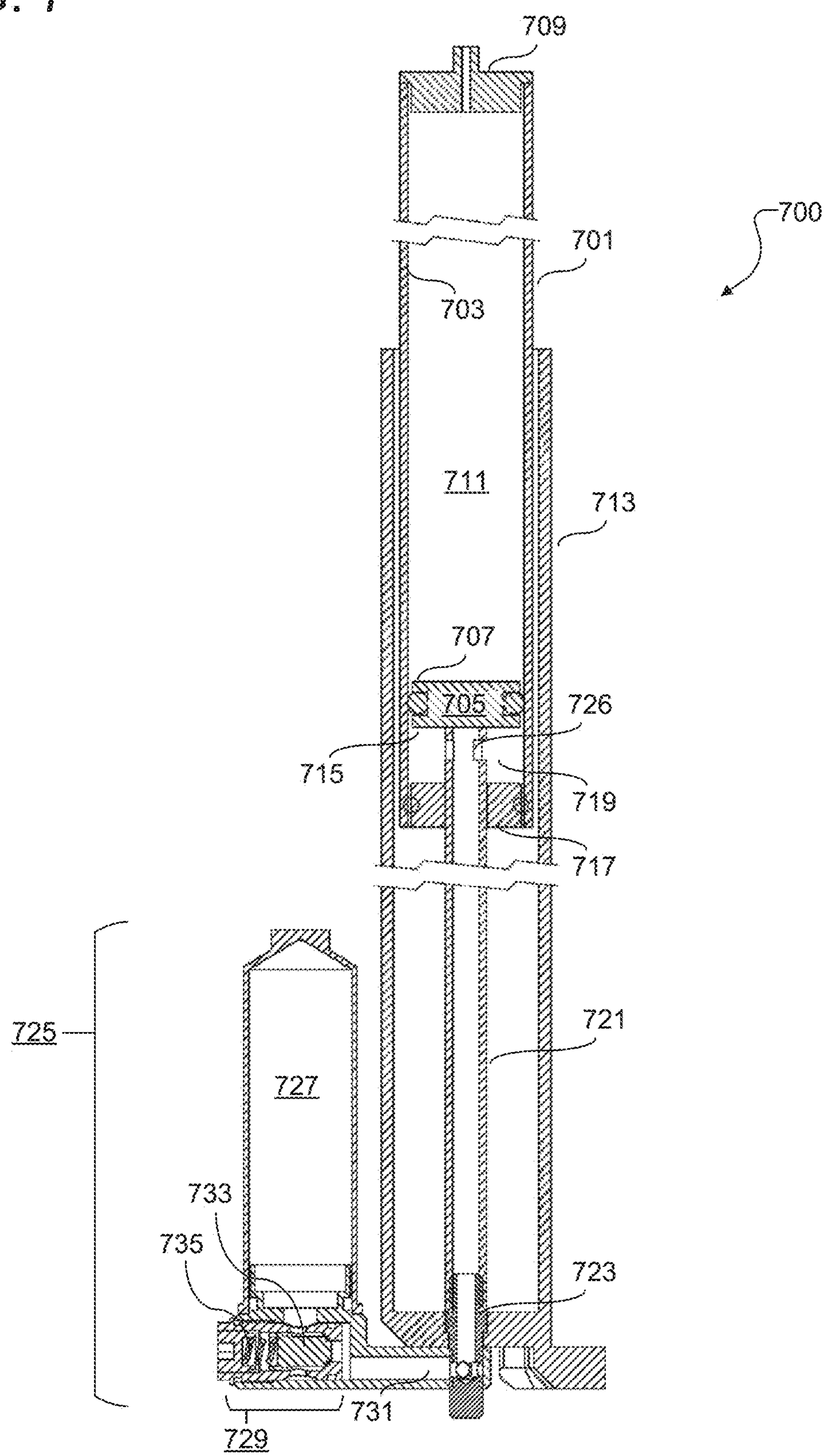
FIG. 7 illustrates, in cutaway view, an example of a suspension apparatus according to various embodiments of this disclosure.

FIG. 7 illustrates an example of a suspension apparatus 700 providing selective fluid pressure communication, according to various embodiments of this disclosure.

Referring to the non-limiting example of FIG. 7, suspension apparatus 700 comprises a spring tube body 701, comprising a section of pressure-resistant material (for example, magnesium, aluminum, steel, carbon fiber or combinations thereof) defining a smooth inner bore 703. In certain embodiments, spring tube body 701 is at least partially disposed within a leg of suspension fork (for example, as part of a gas spring cartridge). In some embodiments, spring tube body 701 is part of a leg (for example, a stanchion) of the suspension fork, which reciprocates within another component of the suspension fork, for example, fork lower 713.

According to some embodiments, suspension apparatus 700 further comprises a spring piston 705, which is slidably and sealably disposed within spring tube body 701 and has a first side 707, which, in combination with a portion of inner bore 703 of spring tube body 701, and top cap 709 defines a primary positive gas spring chamber 711 containing a volume of gas whose pressure exerts a force upon first side 707 of spring piston 705. As shown in the explanatory example of FIG. 7, spring piston 705 further comprises a second side 715, which, in conjunction with lower bulkhead 717 and another portion of inner bore 703, bounds part of a primary negative gas spring chamber 719. A hollow piston shaft 721 connects at a first end to second side 715 of spring piston 705 and at a second side to a hollow connector 723 anchoring hollow piston shaft 721 to lower 713. In some embodiments, lower 713 is connected to an axle of a wheel of the vehicle, and normal force from the wheel's contact with the ground is transmitted to spring piston 705 through hollow piston shaft 721. Hollow piston shaft 721 further comprises one or more apertures 726 through which gas in a first portion of the primary negative gas spring chamber can pass to the second portion of the negative gas spring chamber contained within hollow piston shaft 721. According to some embodiments, aperture(s) 726 may be proportioned to partially restrict the flow of air from the hollow piston shaft 721 to the portion of spring tube body 701 below second side 715 of spring piston 705, and act as damping apertures, removing energy from the system.

As further illustrated in the example of FIG. 7, a secondary negative gas spring body 725 connects to hollow piston shaft 721 through hollow connector 723. In this example, secondary negative gas spring body 725 is at least partially external to a fork, or shock canister. According to certain embodiments, secondary negative gas spring body 725 comprises a secondary negative gas spring chamber 727, a separator 729, and a pathway in portion 731 comprising a portion of the primary negative gas spring chamber. In this illustrative example, separator 729 comprises a valve spool 733 and a preload spring 735. Valve spool 733 has surfaces exposed to secondary negative gas spring chamber 727 and portion 731 of primary negative gas spring chamber 719. The pressure of the gas in secondary negative gas spring chamber 727 and primary negative gas spring chamber 719 exert a force upon valve spool 733 pushing it towards an "open" position, wherein there is direct fluid communication between the primary and negative gas spring chambers. Preload spring 735 exerts a force pushing valve spool 733 in the opposite direction—towards a "closed" position, where there is no fluid pressure communication, and secondary negative gas spring chamber 727 is separate from primary negative gas spring chamber 719. Thus, in a first portion of the travel of spring piston 705, the primary and secondary negative gas spring chambers are in a relatively uncompressed state, and the pressure exerted by the gas in these chambers upon valve spool 733 is greater than that exerted upon valve spool 733 by preload spring 735. As suspension apparatus 700 is compressed, the effective volume of the negative gas spring chamber increases, and by implication, the gas pressure exerted upon valve spool 733 decreases, until a threshold point is reached, where the pressure upon valve spool 733 by preload spring 735 is greater, and separator 729 shifts to a "closed" position, thereby beginning a second portion of the travel of spring piston 705. According to various embodiments, the threshold point, where the separator moves between its "open" and "closed" positions, and the first portion of the travel ends, and the second portion of the travel begins, can be tuned by adjusting the preload on preload spring 735.

While FIG. 7 has been described with reference to embodiments utilizing a mechanical preload spring 735, other embodiments are possible and within the contemplated scope of this disclosure. For example, in some embodiments, valve spool 733 comprises part of a mid-stroke support valve which closes off fluid communication between the primary and secondary negative gas spring chambers. In some embodiments, the actuating force of the midstroke support valve (i.e., the force moving the valve to a closed position in the second portion of the travel of spring piston 705) may be provided pneumatically, from pressure exerted by a gas in a sealed volume in the space occupied by valve spool 733. According to such embodiments, the sealed volume may be pressurized by a charging valve. In some embodiments, the charging valve temporarily allows fluid communication from primary negative gas spring chamber 719 into the sealed volume, thereby providing a pneumatic force upon valve spool 733. In some embodiments, a separate charging valve adds pressurized gas to the sealed volume.

Figure 8:
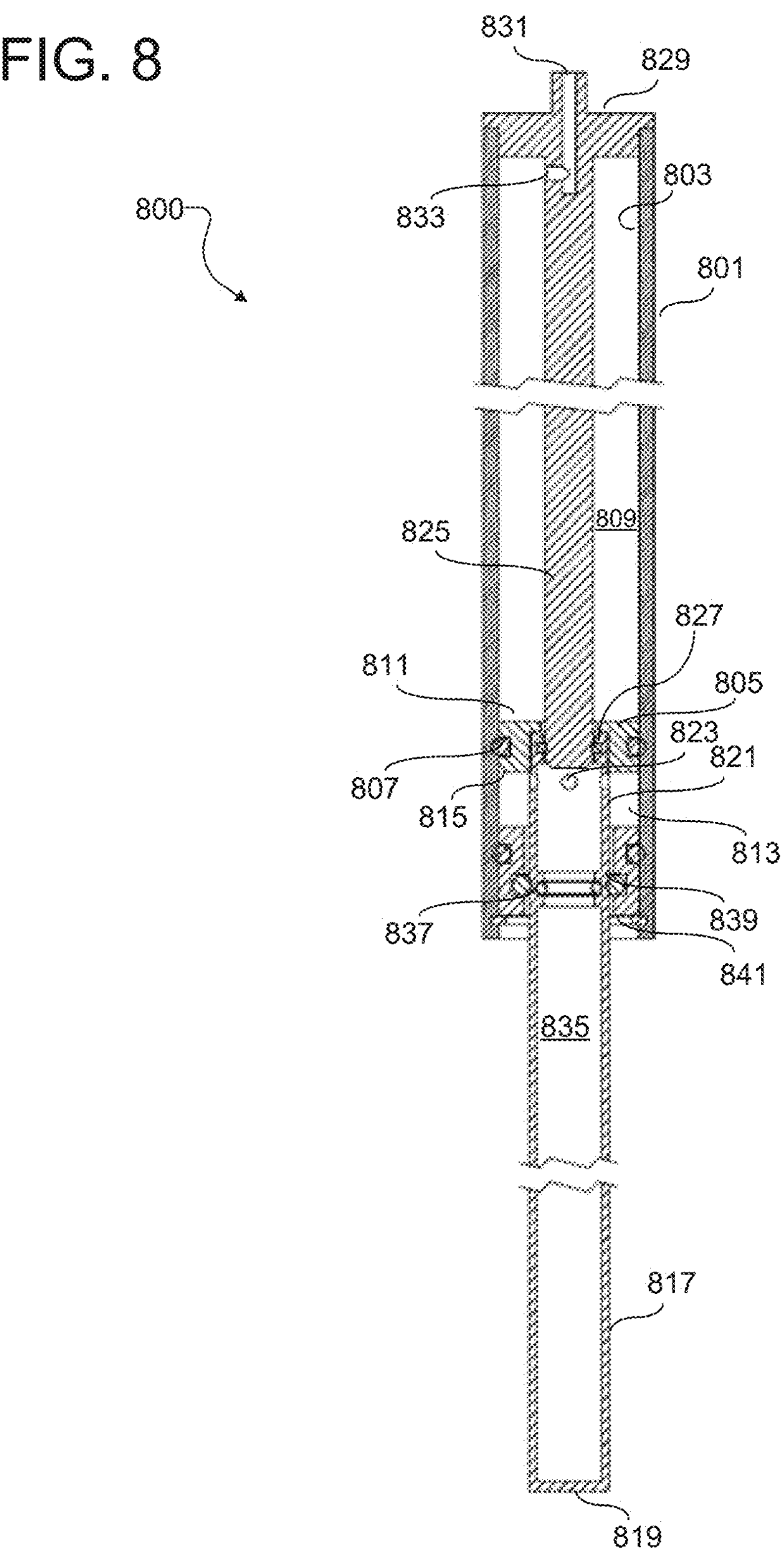
FIG. 8 illustrates, in cutaway view, an example of a suspension apparatus according to various embodiments of this disclosure.

FIG. 8 illustrates an example of a suspension apparatus 800 which provides selective fluid pressure communication between a primary and secondary negative gas spring chamber, according to various embodiments of this disclosure.

Referring to the illustrative example of FIG. 8, suspension apparatus 800 may be at least be partially contained within the leg of a suspension fork, for example, as a gas spring cartridge. According to various embodiments, suspension apparatus comprises a spring tube body 801, which is a hollow section of a pressure resistant material (for example, steel, titanium, magnesium, or alloys thereof) containing a substantially smooth inner bore 803. Suspension apparatus 800 further comprises a spring piston 805 that is slidably and sealingly engaged with inner bore 803. In certain embodiments, one or more O-rings or gaskets 807 provide a physical interface between spring piston 805 and inner bore 803 which allows spring piston 805 to translate axially within spring tube body 801 while maintaining a gas-tight seal, preventing gas in a primary positive gas spring chamber 809 bounded, at least in part, by a first side 811 of spring piston 805 passing to a primary negative gas spring chamber 813, bounded at least in part by second side 815 of gas spring chamber. In certain embodiments, there may be an equalization mechanism, such as a valve or dimple in inner bore 803 to allow the passage of gas from primary positive gas spring chamber 809 to primary negative gas spring chamber 813 at the beginning of spring piston 805's travel, thereby ensuring that the pressure on both sides of spring piston 805 is equal at the start of spring piston 805's travel.

As shown in the explanatory example of FIG. 8, suspension apparatus 800 further comprises a hollow spring plunger tube 817, which is sealed at a first end 819, and attached to second side 815 of spring piston 805 at a second end 821. According to various embodiments, spring plunger tube 817 further comprises one or more apertures 823 permitting direct fluid communication in and out spring plunger tube 817. As shown in the illustrative example of FIG. 8, spring plunger tube bounds part of secondary negative gas spring chamber 835

According to various embodiments, suspension apparatus 800 further comprises a spring tube 825, wherein spring tube 825 is configured to sealingly and slidingly engage with a first seal 827 throughout most, if not, all of the travel of spring piston 805. In some embodiments, spring tube 825 may act as an equalization mechanism, disengaging with first seal 827 at the very beginning of the travel of spring piston 805. First seal 827 is formed within a through-hole in spring piston 805, which has a first opening on first side 811 and a second opening on second side 815 of spring piston 805. As shown in the explanatory example of FIG. 8, spring tube 825 is connected to, or integral with, a surface forming an upper portion of primary positive gas spring chamber 809. In certain embodiments, spring tube 825 is connected at one end to top cap 829, which bounds at least part of primary positive gas spring chamber 809. Top cap 829 may comprise a valve 831 (for example, a Schrader valve) for pressurizing suspension apparatus 800, wherein valve 831 includes a pathway 833 connecting to primary positive gas spring chamber 809.

Depending on embodiments, spring tube 825 may be substantially hollow and have a consistent cross section along the portion of its length below pathway 833 (i.e., an open-ended tube). In such embodiments, compression of the suspension apparatus and movement of spring piston 805 towards top cap 829 does not significantly compress gas within secondary negative gas spring chamber 835. In some embodiments, spring tube 825 is a hollow tube with an annular opening at the bottom portion, which restricts the flow of air into spring tube 825 and draws energy out of the system during compression. In some embodiments, spring tube 825 comprises a solid section of material.

Referring to the illustrative example of FIG. 8, suspension apparatus 800 further comprises a second seal 837 disposed within spring tube 825 at a predetermined distance relative to first seal 827. Second seal 837 is configured to slidably and sealingly interface with the exterior of spring tube 825 at a point in the travel when spring piston 805 has translated upwards towards is compressed to the point that second seal 837 meets the bottom end of spring tube 825. As shown in FIG. 8, suspension apparatus 800 further comprises a third seal 839, which is located within a lower bulkhead 841 of suspension apparatus, and which slidably and sealingly interfaces with the exterior of spring plunger tube 817.

According to various embodiments, spring tube 825, second seal 837 and one or more apertures 823, form a separator which selectively permits and prohibits fluid pressure communication between secondary negative gas spring chamber 835 and primary negative gas spring chamber 813. During a first portion of the travel of spring piston 805 coinciding with the initial and early mid-stroke of suspension apparatus 800, spring tube 825 is disposed above second seal 837, as shown in FIG. 8. Notably, spring tube 825 is not yet sealing and slidingly interfaced with second seal 837. As such, during this first portion of the travel, gas can move from secondary negative gas spring chamber 835 to primary negative gas spring chamber 813 through aperture(s) 823.

As suspension apparatus 800 is further compressed, spring piston 805 continues to translate towards top cap 829, and at a predetermined point marking the end of the first portion of the travel of spring piston 805 and the start of the second portion of the travel of spring piston 805, the exterior of spring tube 825 sealingly and slidingly interfaces with second seal 837. When spring tube 825 is so interfaced with second seal 837, fluid communication between secondary negative gas spring chamber 835 and primary negative gas spring chamber 813 is blocked, and the effective negative spring chamber volume drops to the volume of the space above the interface between spring tube 825 and second seal 837.

While not shown in the illustrative example of FIG. 8, modifications and embodiments with additional components are possible, and within the intended scope of this disclosure. For example, in some embodiments, volumetric spacers may be inserted into either primary positive gas spring chamber 809 or secondary negative gas spring chamber 835 to tune the spring curve. Further, top-out and bottom-out bumpers may be included within spring tube body 801. As noted elsewhere in this disclosure, embodiments as described herein are generally compatible with most preexisting hardware for tuning gas springs, and for avoiding damage due to hard bottom and top-outs.

This written description uses examples to disclose embodiments and to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any sub combination. Further, references to values stated in ranges include each and every value within that range.

What is claimed is:

1. An apparatus for use with a suspension fork or shock absorber, the apparatus comprising:

a spring piston having a first side and a second side;

a spring tube body comprising a first end and a second end, wherein the spring piston is slidably disposed within the spring tube body to move within the spring tube body over a travel along an axis of reciprocation, wherein the spring piston bounds a primary positive gas spring chamber disposed between the first side of the spring piston and the first end of the spring tube body and wherein the spring piston bounds at least a first portion of a primary negative gas spring chamber disposed between the second side of the spring piston and the second end of the spring tube body;

a secondary negative gas spring chamber;

a sealed interface contacting the spring piston and the spring tube body; and a separator disposed between the secondary negative gas spring chamber and the primary negative gas spring chamber, wherein the separator permits fluid pressure communication between the primary negative gas spring chamber and the secondary negative gas spring chamber over a first portion of the travel of the spring piston, wherein the separator prevents fluid pressure communication between the primary negative gas spring chamber and the secondary negative gas spring chamber over a second portion of the travel of the spring piston, wherein the travel of the spring piston includes an equilibrium point at which a first pressure exerted by the primary positive gas spring chamber on the first side of the spring piston is equal to a second pressure exerted by the primary negative gas spring chamber and the secondary negative gas spring chamber;

wherein the primary positive gas chamber, primary negative gas chamber and secondary negative gas chamber are filled with a compressible gas; and wherein the sealed interface prevents fluid communication between the primary positive gas chamber and the primary negative gas chamber at points along the spring piston's travel away from the equilibrium point.

2. The apparatus of claim 1, wherein the primary negative gas spring chamber and the secondary negative gas spring chamber are in direct fluid communication over the first portion of the travel of the spring piston.

3. The apparatus of claim 1, wherein the separator comprises a floating piston disposed between the primary negative gas spring chamber and the secondary negative gas spring chamber.

4. The apparatus of claim 1, further comprising an equalization mechanism permitting fluid communication between the primary positive gas spring chamber and the primary negative gas spring chamber at a point in the travel of the spring piston proximate to a start point of the first portion of the travel of the spring piston.

5. The apparatus of claim 1, wherein the spring tube body comprises a portion of a leg of the suspension fork, wherein the secondary negative gas spring chamber is external to the leg of the suspension fork.

6. The apparatus of claim 5, further comprising a secondary negative gas spring body providing the secondary negative gas spring chamber.

7. The apparatus of claim 6, wherein the separator is slidably disposed within the secondary negative gas spring chamber body, and wherein gas within a second portion of the primary negative gas spring chamber and gas within the secondary negative gas spring chamber is uncompressed when the spring piston is in the first portion of the travel of the spring piston.

8. The apparatus of claim 1, wherein an effective volume of the primary negative gas spring chamber changes discontinuously as the spring piston moves from the first portion of the travel of the spring piston to the second portion of the spring piston.

9. The apparatus of claim 1, wherein the separator permits reciprocal fluid pressure communication between the primary negative gas spring chamber and the secondary negative gas spring chamber over a first portion of the travel of the spring piston.

* * * * *